United States Patent
Dockus et al.

(10) Patent No.: US 7,000,823 B2
(45) Date of Patent: Feb. 21, 2006

(54) FLUXLESS BRAZING

(75) Inventors: Kostas F. Dockus, Cicero, IL (US); Robert H. Krueger, Spring Grove, IL (US); Brian E. Cheadle, Bramalea (CA); Mark S. Kozdras, Fergus (CA); Feng Liang, Oakville (CA)

(73) Assignee: Dana Canada Corporation, (CA)

( * ) Notice: Subject to any disclaimer, the term of this patent is extended or adjusted under 35 U.S.C. 154(b) by 81 days.

(21) Appl. No.: 10/300,836

(22) Filed: Nov. 21, 2002

(65) Prior Publication Data

US 2003/0155409 A1 Aug. 21, 2003

Related U.S. Application Data

(63) Continuation-in-part of application No. 09/990,507, filed on Nov. 21, 2001.

(51) Int. Cl.
- B23K 1/19 (2006.01)
- B32B 35/24 (2006.01)
- B23B 15/20 (2006.01)

(52) U.S. Cl. ............................ 228/262.51; 228/262.5; 428/650; 428/652

(58) Field of Classification Search ................ 228/245, 228/254, 262.51, 262.5; 428/650, 652, 654, 428/648
See application file for complete search history.

(56) References Cited

U.S. PATENT DOCUMENTS

| | | | |
|---|---|---|---|
| 1,627,900 A | 5/1927 | Hewitson | |
| 2,142,564 A | 1/1939 | Korpium | |
| 2,745,799 A | 5/1956 | Patrie | |
| 2,821,014 A | 1/1958 | Miller | |
| 3,321,828 A | 5/1967 | Miller | |
| 3,332,517 A | 7/1967 | Voser | |
| 3,338,725 A | 8/1967 | Banks | |
| 3,417,005 A | 12/1968 | Baig | |
| 3,482,305 A | 12/1969 | Dockus et al. | |
| 3,553,825 A | 1/1971 | Dockus | |
| 3,597,658 A | 8/1971 | Rivera | |
| 3,675,310 A | 7/1972 | Schwaneke et al. | |
| 3,703,763 A | 11/1972 | Berry | |
| 3,843,333 A | 10/1974 | Woods | |
| 3,970,237 A | 7/1976 | Dockus | |
| 4,028,200 A * | 6/1977 | Dockus | 205/112 |
| 4,164,454 A | 8/1979 | Schober | |
| 4,388,159 A | 6/1983 | Dockus | |
| 4,489,140 A | 12/1984 | Pulliam | |

(Continued)

FOREIGN PATENT DOCUMENTS

EP 587307 B1 12/1996

(Continued)

OTHER PUBLICATIONS

Aluminum Standards and Data 1984, pps. 1-2; 7; 15-21; 29-30.

(Continued)

Primary Examiner—Lynne R. Edmondson
(74) Attorney, Agent, or Firm—Michael J. Bell; Howrey LLP

(57) ABSTRACT

A method of manufacturing an article of manufacture for use in a fluxless brazing process is disclosed. The method comprises the step of applying a braze-promoting layer including one or more metals selected from the group consisting of nickel, cobalt and iron, onto a bonding layer which comprises one or more metals selected from the group consisting of zinc, tin, lead, bismuth, nickel, antimony and thallium and which is disposed on a substrate including aluminum.

30 Claims, 9 Drawing Sheets

U.S. PATENT DOCUMENTS

| | | | |
|---|---|---|---|
| 4,785,092 A | 11/1988 | Nanba et al. | |
| 4,826,736 A | 5/1989 | Nakamura | |
| 4,890,784 A | 1/1990 | Bampton | |
| 4,901,908 A | 2/1990 | Negura et al. | |
| 5,044,546 A | 9/1991 | De Clerck | |
| 5,069,980 A | 12/1991 | Namba et al. | |
| 5,072,789 A | 12/1991 | Usui et al. | |
| 5,100,048 A | 3/1992 | Timsit | |
| 5,232,788 A | 8/1993 | Timsit et al. | |
| 5,316,206 A | 5/1994 | Syslak | |
| 5,422,191 A | 6/1995 | Childree | |
| 5,464,146 A | 11/1995 | Zaluzec et al. | |
| 5,466,360 A | 11/1995 | Ehrsam et al. | |
| 5,894,054 A | 4/1999 | Paruchuri et al. | |
| 6,129,262 A | 10/2000 | Cooper et al. | |
| 6,379,818 B1 * | 4/2002 | Mooij et al. | 428/648 |
| 6,383,661 B1 * | 5/2002 | Wittebrood et al. | 428/650 |
| 6,391,476 B1 | 5/2002 | Wittebrood et al. | |
| 6,503,640 B1 | 1/2003 | Wittebrood et al. | |
| 6,568,584 B1 | 5/2003 | Wittebrood et al. | |
| 6,596,413 B1 * | 7/2003 | Wittebrood et al. | 428/652 |
| 6,599,645 B1 | 7/2003 | Wittebrood | |
| 6,796,484 B1 * | 9/2004 | Wittebrood et al. | 228/249 |
| 2001/0040180 A1 | 11/2001 | Wittebrood et al. | |
| 2002/0012811 A1 | 1/2002 | Wittebrood et al. | |
| 2002/0050511 A1 | 5/2002 | Wittebrood et al. | |
| 2002/0086179 A1 * | 7/2002 | Wittebrood | 428/652 |
| 2002/0088717 A1 | 7/2002 | Wittebrood et al. | |
| 2002/0139685 A1 | 10/2002 | Colombier et al. | |
| 2002/0175205 A1 | 11/2002 | Wittebrood et al. | |
| 2003/0042146 A1 | 3/2003 | Wijenberg et al. | |
| 2003/0064242 A1 | 4/2003 | Wittebrood et al. | |
| 2003/0091856 A1 | 5/2003 | Wittebrood | |
| 2003/0189082 A1 | 10/2003 | Dockus | |
| 2004/0035911 A1 * | 2/2004 | Dockus et al. | 228/56.3 |
| 2004/0038070 A1 * | 2/2004 | Dockus et al. | 428/652 |

FOREIGN PATENT DOCUMENTS

| | | |
|---|---|---|
| EP | 0605323 B1 | 5/2000 |
| EP | 0595601 B2 | 7/2001 |
| FR | 2617868 | 1/1989 |
| GB | 1087054 | 9/1964 |
| GB | 2270086 | 3/1984 |
| WO | WO0071784 | 1/2001 |
| WO | WO0168312 | 9/2001 |
| WO | WO0188226 | 11/2001 |
| WO | WO0238321 | 5/2002 |
| WO | WO0238326 | 5/2002 |
| WO | WO0207928 | 6/2002 |

OTHER PUBLICATIONS

Aluminum Standards and Data 1997, The Aluminum Association, 1996, pps. 6-1-6-6.

Designation: B 253—73, Standard Recommended Practice for Preparation of and Electroplating on Aluminum Alloys by the Zincate Process, 1974, pps. 72-81.

Designation: B 253-87 (Reapproved 1993), Standard Guide for Preparation of Aluminum Alloys for Electroplating, pps. 48-54.

Durney, Electroplating Engineering Handbook, Fourth Edition, 1984, pps. 185-188; 245; 247-250.

Engström et al., A Multilayer Clad Aluminum Material with Improved Brazing Properties, 1988, pps. 222-226.

Finstock and Brazing Products for Heat Exchanger Applications, Alcan.

Golby et al., A Study of the Effect of Pretreatment Procedures on the Plating of Aluminium Alloys, Surface Technology, 12, (1981) 141-155.

Golby et al., Factors Influencing the Growth of Zinc Immersion Deposits on Aluminum Alloys, Transactions of the Institute of Metal Finishing, 1981, vol. 59, pps. 17-24.

Lentz et al., Aluminum Brazing Handbook, Third Edition, 1979, pps. 5-6; 8; 24-33; 36; 58-61; 65-66.

Metal Progress, Mid-Jun. DATABOOK 1980, Properties and Applications of Wrought Aluminum Alloys, pps. 56-57.

Metals & Alloys in the Unified Numbering System, Seventh Edition, 1996, pps. 31-35; 42; 44.

Pearson et al., Improvements in the Pretreatment of Aluminum as a Substrate for Electrodeposition, Trans IMF, 1997, 75(3), pps. 93-97.

Such et al., An Improvement in Zincate Method for Plating on Aluminum, 1965, pps. 1027-1034.

The Coil which Goes Around the World Technical Data.

Van Horn, Aluminum, vol. I. Properties, Physical Metallurgy and Phase Diagrams, 1987, pps. v; 48-55; 162-165; 178-179; 192-209; 300-303.

Wernick et al., The Surface Treatment and Finishing of Aluminium and its Alloys, Fifth Edition, vol. 1,1987, pps. iii-v; xxx-xxxi; 1'80-183; 190-203.

Wernick et al., The Surface Treatment and Finishing of Aluminum and its Alloys, Fifth Edition, vol. 2, 1987, pps. 1023-1083.

Wyszynski, An Immersion Alloy Pretreatment for Electroplating on Aluminium, Transactions of the Institute of Metal Finishing, 1967, vol. 45, pps. 147-154.

Wyszynski, Electrodeposition on Aluminium Alloys, Transactions of the Institute of Metal Finishing, 1980, vol. 58, pps. 34-40.

Reasearch Disclosure 439070, anonymous disclosure, Kenneth Mason Publications Ltd, published Nov. 2000, pp. 1946-1947.

Preparation of and Electroplating on Aluminum Alloys by Zincate Process- American National Standard Institute, Aug. 19, 1974.

B.E. Cheadle and K.F. Dockus, International Congress and Exposition , Detroit, Michigan, Feb. 29-Mar. 4, 1988; SAE Technical Paper Series-Inert Atmosphere Fluxless Brazing of Aluminum Heat Exchangers.

* cited by examiner

IVD 38X

IVD 200X

FERAN 50X

TITANIUM MESH 75X

TITANIUM MESH 240X

FLUXLESS BRAZING

CROSS-REFERENCE TO RELATED APPLICATION

This is a continuation-in-part of U.S. patent application Ser. No. 09/990,507, filed Nov. 21, 2001, now pending, incorporated herein by reference.

FIELD OF THE INVENTION

The present invention relates to improved methods and materials for fluxless brazing, including improved methods for substrate pre-treatment with special attention to application and use of bond promoting layers, improved methods for application and use of braze promoter, improved methods of application and use of braze modifiers, and improved methods for application and use of braze temperature modifiers. The invention further relates to articles of manufacture derived from the various processes, brazed products derived from the various processes and articles of manufacture, including the ability to join similar or dissimilar metals with the article of manufacture.

BACKGROUND OF THE INVENTION

Aluminum brazing is accomplished by heating with a torch or other localized heat source such, by salt dipping, or in a furnace. Furnace brazing can be performed in air using active salts such as zinc chloride, however preferred furnace brazing processes use protective atmospheres in combination with either fluxless braze promoters or non-corrosive fluxes. Various methods of brazing aluminum are known in the prior art. In the context of heat exchanger assemblies, which are characterized by thin aluminum components, brazing has heretofore commonly been effected in the prior art by furnace brazing, most commonly, by controlled atmosphere brazing (CAB) flux and vacuum brazing (VB). Sometimes furnace brazing is used to assemble one set of components then additional components are brazed afterwards using a second brazing operation that may use a localized heating method to avoid damage to the first brazed assembly. To facilitate brazing aluminum, filler metals are commercially available as (1) preforms of wire or shim stock, (2) a paste of flux and filler metal powder, or (3) a clad layer on brazing sheet composite.

In vacuum brazing, the parts to be brazed are provided with sufficient quantities of magnesium, normally present in the filler metal or in the aluminum or aluminum alloy components, such that, when brought to temperature in a brazing furnace under sufficient vacuum conditions, the magnesium becomes sufficiently volatile to disrupt the oxide layer present and permit the underlying aluminum alloy filler metal to flow together. While this technique provides for good brazing, it is essentially a discontinuous process, resultant from the need to apply a vacuum, and thus, is relatively expensive. It is also difficult to control, as it is very sensitive to oxidizing conditions in the furnace atmosphere, and demands that onerous standards of material cleanliness be maintained. Further, the evaporation of the magnesium leads to condensation in the brazing furnace, which requires frequent removal, thereby further adding to costs.

In controlled atmosphere brazing, the ability to braze does not result from mechanical disruption of the oxide but rather, from chemical modification of the oxide by a fluoride salt flux, typically potassium fluoraluminate, which is applied to the parts. As the name suggests, CAB brazing does not require that a vacuum be drawn, such that the process may readily be carried out on a continuous basis, most typically using an inert gas furnace. While this provides for some reduction in cost, this cost saving is partially offset by the necessity for integration of fluxing systems, many of which will suffer from variable flux loading. Moreover, after the flux has been applied, the flux can be susceptible to flaking, such that contamination of the article of manufacture can occur. The flux can also be difficult to apply, especially on internal joints and can cause problems in terms of furnace corrosion and cleanliness in the finished product. More importantly however, it has been found that the flux can lose activity when exposed to magnesium. Thus, this process is not suitable for brazing magnesium-enriched aluminum alloys. As magnesium is a commonly used alloying element in aluminum to improve, inter alia, strength, this reduces the attractiveness of CAB brazing.

Applications for brazing aluminum are not limited to heat exchangers, however heat exchangers require relatively complex assemblies of stacked plates or tubular members that require reliable, low cost joining of multiple joints. Some heat exchangers, for example oil coolers and air conditioning evaporators, require extensive internal joints that must be brazed, in concert with internal passageways that do not provide a source for particulate flux residues in the functional lubrication or refrigerant system. Recently, stacked assemblies of brazed metal plates are being considered as possible methods of assembly of fuel cell engines. Because of their structural similarity to plate-type heat exchangers, heat exchanger brazing technology is of significant interest. The joining of fuel cell plates requires reliable laminar type bonds (extended lap joints). However, fuel cell plates tend to be thin and have intricately formed, narrow fuel field channels which are easily clogged by flux or by excess filler metal flow. In addition, fuel cell systems can be particularly sensitive to ionic species contamination. Using prior art CAB processes, it has been difficult to satisfactorily braze fuel cell plates without internal flux contamination, and therefore CAB is unattractive, and the cost of vacuum brazing is prohibitive. As a consequence, fluxless brazing methods are of increased recent interest, for both heat exchanger and fuel cell engine applications.

An alternative method of brazing aluminum is described in U.S. Pat. No. 3,482,305. In this method, a braze-promoting metal of cobalt, iron, or, more preferably, nickel, is coated on a part to be brazed, in a manner more fully described in U.S. Pat. No. 4,028,200. If properly applied, the nickel reacts exothermically with the underlying aluminum-silicon alloy, thereby presumably disrupting the aluminum oxide layer, and permitting the underlying aluminum metal to flow together and join. Vacuum conditions are not required, such that this method overcomes the limitations of VB. Further, as this method does not require a CAB-type fluoride flux, it is suitable for utilization with magnesium-enriched aluminum alloys, such as are beneficially utilized in heat exchanger construction, and thus, overcomes the drawbacks of CAB. As additional benefits, this process has utility in association with a wide variety of aluminum alloys. However, the bath described in U.S. Pat. No. 4,028,200 provides for relatively slow plating; and has a relatively limited useful life, thereby resulting in significant cost.

Other mechanisms are known in the plating industry as being capable of providing a deposit of nickel upon aluminum. One very popular electroplating bath is the Watts bath, which is known to have some utility in plating decorative nickel on aluminum substrates, provided a surface pretreatment is first carried out. Preferably, a zincate layer is first applied, followed by a thin copper plate (eg. Rochelle-type copper cyanide strike solution) or a thin nickel plate (eg. Neutral nickel strike, nickel glycolate strike), followed by the Watts bath. However, these preplate steps add cost, and in the case of copper, have deleterious environmental aspects, resultant from the use of cyanide. Copper has a further disadvantage in that it can negatively affect the corrosion resistance of aluminum products. Although it is possible to plate nickel directly on the zincate layer, the Watts bath is difficult to control in these circumstances, such that satisfactory adhesion or coverage of nickel is not always obtained. Further, addition of lead to the Watts bath reduces its plating rate, yet further limiting the attractiveness of the Watts bath, given the known benefits associated with the inclusion of lead in the nickel deposit.

SUMMARY OF THE INVENTION

According to one aspect, the invention comprises a method of manufacturing an article of manufacture for use in a fluxless brazing process, the method including the step of applying a braze-promoting layer or layers including one or more metals selected from the group consisting of nickel, cobalt and iron, onto a bonding layer which includes one or more metals selected from the group consisting of zinc, tin, lead, bismuth, nickel, antimony and thallium and which is disposed on a substrate comprising aluminum, the junction of the bonding layer and substrate defining a target surface of the substrate.

According to another aspect, the invention comprises a method of manufacturing an article of manufacture for use in an improved fluxless brazing process, the method including the step of plating a braze-promoting layer including one or more metals selected from the group consisting of nickel and cobalt, onto a substrate including aluminum, the junction of the braze-promoting layer and the substrate defining a target surface of the substrate, wherein the application of the braze-promoting layer and/or the bonding layer is preceded by or concurrent with mechanical abrasion of the substrate such that the target surface defines a plurality of reentrant edges.

According to a further aspect, the invention comprises a method of manufacturing an article of manufacture for use in a fluxless brazing process, the method including the step of electroplating a braze-promoting layer including one or more metals selected from the group consisting of nickel or cobalt, onto a substrate including aluminum, wherein the electroplating is carried out in an aqueous bath having a pH of from about 2 to 7 and including, in solution, said one or more metals.

According to a further aspect, the invention comprises a method of manufacturing an article of manufacture for use in a fluxless brazing process, the method including the step of electroplating a braze-promoting layer including one or more metals selected from the group consisting of nickel or cobalt, onto a substrate including aluminum, wherein the electroplating is carried out in an aqueous bath having a pH of from about 5 to 7 and including, in solution, said one or more metals.

According to a yet further aspect, the invention comprises a method of manufacturing an article of manufacture for use in a fluxless brazing process, the method including the step of plating a braze-promoting layer including nickel onto a substrate including aluminum, wherein the plating is carried out in an aqueous bath consisting of an aqueous solution of: from about 3 to about 20 weight percent of nickel sulfate; from about 3 to about 10 weight percent of nickel chloride; from about 6 to about 30 weight percent of a buffering salt selected from the group consisting of sodium citrate and sodium gluconate; from about 0.005 to about 1.0 weight percent of a lead salt selected from the group consisting of lead acetate and lead citrate; and ammonium, wherein the bath has a pH value in the range of about 3 to 12 and has a mole ratio of nickel:citrate:ammonium in solution of about 1:0.5 to 1.5:1 to 6.

According to yet another aspect, the invention comprises a method of manufacturing an article of manufacture for use in a fluxless brazing process, the method including the step of plating a braze-promoting layer including nickel onto a substrate including aluminum, wherein the electroplating is carried out in an aqueous bath consisting of an aqueous solution of nickel, citrate and ammonium, wherein the plating bath has a pH value in the range of about 2 to 12 and has a mole ratio of nickel:citrate:ammonium in solution of about 1:0.05 to 1.5:0.05 to 6.

According to yet another aspect, the invention comprises a method of manufacturing an article of manufacture for use in a fluxless brazing process, the method including the step of plating a braze-promoting layer including nickel onto a substrate including aluminum, wherein the electroplating is carried out in an aqueous bath consisting of an aqueous solution of nickel, citrate and ammonium, wherein the plating bath has a pH value in the range of about 5 to 12 and has a mole ratio of nickel:citrate:ammonium in solution of about 1:0.5 to 1.5:1 to 6.

According to still yet another aspect, the invention comprises an article of manufacture for use in an improved fluxless brazing process, including a substrate including aluminum; a bonding layer on the substrate which comprises one or more metals selected from the group consisting of zinc, tin, lead, bismuth, nickel, antimony and thallium; and a braze-promoting layer on the bonding layer including one or more metals selected from the group consisting of nickel, cobalt and iron.

Other advantages, features and characteristics of the present invention, will become more apparent upon consideration of the following detailed description with reference to the accompanying drawings, the latter of which is briefly described hereinbelow.

A method of manufacturing a brazing sheet product, comprising the steps of: plating a layer comprising nickel onto a surface of a sheet comprising a core sheet and a clad layer on the core sheet, the clad layer being made of an aluminium alloy containing silicon in an amount in the range 2 to 18% by weight and said surface being a surface of the clad layer, and pretreating said surface before the plating step, wherein the pretreating comprises applying a bonding layer comprising zinc or tin on said surface.

A brazing sheet product comprising a core sheet (1), a clad layer (2) on said core sheet (1) made of an aluminium alloy containing silicon in an amount in the range 2 to 18% by weight, a layer (3) comprising nickel on the outer surface of said clad layer, and a layer (4) comprising zinc or tin as a bonding layer between said outer surface of said clad layer and said layer comprising nickel.

A method of manufacturing an assembly of brazed components, comprising the steps of: (a) forming said components of which at least one is made from brazing sheet product according to the invention; (b) assembling the components into the assembly; (c) brazing the assembly under a vacuum or in an inert atmosphere in the absence of a brazing-flux at elevated temperature for a period long enough for melting and spreading of the clad layer; (d) cooling the brazed assembly.

A method of manufacturing an Al or Al alloy workpiece comprising the steps of (a) providing an Al or Al alloy workpiece, (b) pre-treating the outersurface of the Al or Al alloy workpiece, and (c) plating a metal layer comprising nickel onto said outersurface of the Al or Al alloy workpiece, wherein during step (c) said metal layer comprising nickel is deposited by plating both nickel and bismuth using an aqueous bath having a pH in the range of 2.5 to 10, and comprising a nickel-ion concentration in a range of 10 to 100 g/l, a bismuth-ion concentration in the range of 0.01 to 10 g/l, a citrate-ion concentration in the range of 40 to 150 g/l, a gluconate-ion concentration in the range of 2 to 80 g/l, a chloride- or fluoride-ion concentration in the range of 1 to 50 g/l.

An aqueous bath for the electrodeposition of a layer of nickel and bismuth on an Al or Al alloy workpiece, having a pH in the range of 2.5 to 10, and comprising a nickel-ion concentration in a range of 10 to 100 g/l, a bismuth-ion concentration in the range of 0.01 to 10 g/l, a citrate-ion concentration in the range of 50 to 150 g/l, a gluconate-ion concentration in the range of 2 to 80 g/l, a chloride- or fluoride-ion concentration in the range of 1 to 50 g/l.

An assembly of components joined by brazing, at least one said components being an Al or Al alloy workpiece produced by the method in accordance with the invention.

Method of manufacturing an assembly of brazed components, comprising the steps of: (a) shaping parts of which at least one is made from an Al or Al alloy workpiece obtained by the method according to the invention; (b) assembling the parts into the assembly; (c) brazing the assembly in an inert atmosphere in the absence of a brazing-flux at elevated temperature for a period long enough for melting and spreading of the molten filler; (d) cooling the brazed assembly to below 100° C.

Brazing sheet product comprising: a core sheet (1) made of an aluminium alloy; an aluminium clad layer (2) cladding at least one of the surfaces of said core sheet; a layer (3) comprising nickel on the outersurface of one or both said aluminium clad layer or layers (2); and a layer (4) comprising zinc or tin as a bonding layer between said outersurface of said aluminium clad layer or layers and said layer (3) comprising nickel; wherein said aluminium clad layer (2) is made of an alloy which comprises, in weight percent:

Si 2 to 18
Mg up to 8.0
Zn up to 5.0
Cu up to 5.0
Mn up to 0.30
In up to 0.30
Fe up to 0.80
Sr up to 0.20 at least one element selected from the group consisting of:
Bi 0.01 to 1.0
Pb 0.01 to 1.0
Li 0.01 to 1.0
Sb 0.01 to 1.0 impurities each up to 0.05, total impurities up to 0.20, balance aluminium.

A method of manufacturing an assembly of brazed components, comprising the sequential process steps of: (a) forming said components of which at least one is made from brazing sheet product according to the invention; (b) assembling the components into an assembly; (c) brazing the assembly under a vacuum or in an inert atmosphere in the absence of a brazing-flux at elevated temperature for a period long enough for melting and spreading of the clad layer; and (d) cooling the brazed assembly.

A method of use of an aluminium clad alloy in a brazing sheet comprising: forming components of which at least one is made from brazing sheet product according to the invention into an assembly; and brazing the assembly.

A method of use of an aluminium clad alloy comprising forming an assembly from components of which at least one is made from brazing sheet product according to the invention; and brazing the assembly in an inert atmosphere in the absence of a brazing-flux material.

A brazing sheet product comprising: a core sheet (1) made of an aluminum alloy; an aluminum alloy clad layer (2) cladding on at least one of the surfaces of said core sheet; and a layer (3) comprising nickel on the outersurface of one or both said clad layer or layers (2); wherein the brazing sheet product is devoid of a layer comprising zinc or tin as a bonding layer between said outersurface of said aluminum alloy clad layer or layers (2) and said layer comprising nickel (3), and the aluminum clad alloy layer comprises, in weight percent:

Si 2 to 18
Mg up to 8.0
Zn up to 5.0
Cu up to 5.0
Mn up to 0.30
In up to 0.30
Fe up to 0.80
Sr up to 0.20 at least one element selected from the group consisting of:
Bi 0.01 to 1.0
Pb 0.01 to 1.0
Li 0.01 to 1.0
Sb 0.01 to 1.0

An assembly of components comprising at least one brazing sheet product according to the invention joined by brazing to another component.

A method of manufacturing an assembly of brazed components, comprising the sequential process steps of: (a) forming said components of which at least one is made from brazing sheet product according to the invention; (b) assembling the components into an assembly; (c) brazing the assembly under a vacuum or in an inert atmosphere in the absence of a brazing-flux at elevated temperature for a period long enough for melting and spreading of the clad layer; (d) cooling the brazed assembly.

A method of using an aluminum clad alloy in brazing sheet product according to the invention comprising brazing an assembly comprising said aluminum clad alloy.

A method of using an aluminum clad alloy according to the invention comprising brazing an assembly comprising said aluminum clad alloy in an inert atmosphere brazing process in the absence of a brazing-flux.

A method of manufacturing an assembly of components joined by brazing, comprising the steps of: (i) forming said components of which at least one is made from a multi-layered brazing sheet product, the multi-layered brazing sheet product comprising a core sheet (a) having on at least one surface of said core sheet (a) an aluminium clad layer (b), the aluminium clad layer (b) being made of an aluminium alloy comprising silicon in an amount in the range of 2 to 18% by weight, a layer (c) comprising nickel on an outer surface of said aluminium clad layer, and a layer (d) comprising zinc or tin as a bonding layer between said outer surface of said aluminium clad layer (b) and said layer (c) comprising nickel; (ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel; (iii) assembling the respective components into an assembly such that the layer (c) comprising nickel of the multi-layered brazing sheet product faces in part or in whole the at least one other component of a metal dissimilar to the core sheet of the multi-layered brazing sheet product; (iv) brazing the assembly under a vacuum or in an inert atmosphere in the absence of a brazing-flux at elevated temperature for a period long enough for melting and spreading of the aluminium clad layer (b) and all layers exterior thereto; (v) cooling the brazed assembly.

Method of manufacturing an assembly of components joined by brazing, comprising the steps of: (i) forming said components of which at least one is made from a multi-layered brazing sheet product, the multi-layered brazing sheet product comprising a core sheet (a) having on at least one surface of said core sheet an aluminium clad layer (b), the aluminium clad layer being made of an aluminium alloy comprising silicon in an amount in the range of 2 to 18% by weight, and a layer (c) on the outer surface of said aluminium clad layer, the layer (c) comprising nickel and further at least bismuth in a range of at most 5% by weight; (ii) forming at least one other component of a metal dissimilar to the core sheet of the multi-layered brazing sheet product and selected from the group consisting of titanium, plated titanium, coated titanium, bronze, brass, stainless steel, plated stainless steel, coated stainless steel, nickel, nickel alloy, low-carbon steel, plated low-carbon steel, coated low-carbon steel, high-strength steel, coated high-strength steel, and plated high-strength steel; (iii) assembling the respective components into an assembly such that the layer (c) comprising nickel of the multi-layered brazing sheet faces in part or in whole the at least one other component of a metal dissimilar to the core sheet of the multi-layered brazing sheet product; (iv) brazing the assembly under a vacuum or in an inert atmosphere in the absence of a brazing-flux at elevated temperature for a period long enough for melting and spreading of the aluminium clad layer (b) and all layers exterior thereto; (v) cooling the brazed assembly.

A rigid composite metal panel comprising at least two parallel metal members, selected from the group consisting of metal plate and metal sheet, secured to the peaks and troughs of a corrugated aluminium stiffener sheet arranged between said parallel metal members, wherein the corrugated aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight, and a layer comprising nickel on an outer surface of said aluminium alloy clad layer.

A rigid metal composite panel comprising at least two parallel metal members, selected from the group consisting of metal plate and metal sheet, secured to aluminium stiffener sheet having a honeycomb structure arranged between said parallel metal members, wherein the aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight and a layer comprising nickel on an outer surface of said aluminium alloy clad layer.

A method of manufacturing a rigid composite metal panel, comprising the steps of: (a) providing parts, the parts comprising at least two parallel metal members selected from the group consisting of metal plate and metal sheet, and a corrugated aluminium stiffener sheet, wherein the corrugated aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight, and a layer comprising nickel on an outer surface of said aluminium alloy clad layer; (b) assembling the parts into an assembly such that the aluminium stiffener sheet is arranged between the parallel metal members; (c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet; (d) cooling of the joined composite metal panel.

A method of manufacturing a rigid composite metal panel, comprising the steps of: (a) providing parts, the parts comprising at least two parallel metal members selected from the group consisting of metal plate and metal sheet, and an aluminium stiffener sheet having a honeycomb structure arranged between said parallel metal members, wherein the aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight and a layer comprising nickel on an outer surface of said aluminium alloy clad layer; (b) assembling the parts into an assembly such that the aluminium stiffener sheet is arranged between the parallel metal members; (c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet; (d) cooling of the joined composite metal panel.

A method of manufacturing a rigid composite metal panel, comprising the steps of: (a) providing parts, the parts comprising at least two parallel metal members selected from the group consisting of metal plate and metal sheet, and a corrugated aluminium stiffener sheet, wherein the corrugated aluminium stiffener sheet is made from an aluminium brazing sheet product and said aluminium brazing sheet product comprises: a core sheet made of an aluminium alloy having on at least one surface of said core sheet clad an aluminium alloy clad layer, said aluminium alloy clad layer being made of an aluminium alloy comprising silicon in an amount in the range of 2 to 18% by weight, a layer comprising nickel on an outer surface of said aluminium alloy clad layer, and a separately deposited metal layer on one side of said layer comprising nickel, wherein said separately deposited metal layer comprises a metal such that taken together said aluminium alloy clad layer and all layers of the aluminium brazing sheet product exterior thereto form a metal filler having a liquidus temperature in the range of 490 to 570° C.; (b) assembling the parts into an assembly such that the aluminium stiffener sheet is arranged between the parallel metal members; (c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet; (d) cooling of the joined composite metal panel.

An aluminium brazing product comprising: a base substrate (1) of an aluminium alloy comprising silicon in an amount in the range of 2 to 18% by weight, a layer (2) comprising nickel on at least one outer surface of the base substrate (1), and a separately deposited layer (3) on one side of said layer (2) comprising nickel, said separately deposited layer (3) comprising a metal such that taken together said aluminium base substrate (1) and all layers of said aluminium brazing product exterior to said aluminium base substrate (1) form a metal filler having a liquidus temperature in the range of 490 to 570° C.

An aluminium brazing sheet comprising: said aluminium brazing product according to claim 1 and a core sheet (4) made of an aluminium alloy, wherein on at least one surface of said core sheet (4) is coupled the aluminium brazing product, said aluminium base substrate (1) being an aluminium clad layer, and said aluminium substrate (1) being made of said aluminium alloy comprising silicon in the amount in the range of 2 to 18% by weight, said layer (2) comprising nickel being on an outer surface of said aluminium clad layer, said clad layer (1) being between said core sheet (4) and said layer (2) comprising nickel, said separately deposited layer (3) being on one side of said layer (2) comprising nickel, and said separately deposited layer (3) comprising said metal such that taken together said aluminium clad layer (1) and all layers of the aluminium brazing product exterior to the aluminium clad layer (1) form a metal filler having a liquidus temperature in the range of 490 to 570° C.

A method of manufacturing the aluminium brazing product according to the invention, comprising depositing said layer (2) comprising nickel by electroplating both nickel and bismuth using an aqueous bath comprising a nickel-ion concentration in a range of 10 to 100 g/l and a bismuth-ion concentration in the range of 0.01 to 10 g/l.

A method of manufacturing an assembly of brazed components, comprising the steps of: (a) shaping parts of which at least one is made from said brazing sheet according to the invention; (b) assembling the parts into the assembly; (c) brazing the assembly under a vacuum or in an inert atmosphere in the absence of a brazing-flux at elevated temperature for a period long enough for melting and spreading of the molten filler; (d) cooling the brazed assembly.

A method of joining two structural elements comprising contacting the two structural elements, welding together the two structural elements in a welding operation to form a weld joint, and melting aluminium brazing product according to the invention in the form of an aluminium alloy wire or an aluminium alloy rod as filler metal at the weld joint during the welding operation.

DETAILED DESCRIPTION OF PREFERRED EMBODIMENTS

As indicated earlier, the invention comprises improved methods for bonding aluminum based upon the teachings set out in U.S. Pat. Nos. 3,970,237 and 4,028,200, wherein it is taught that nickel and aluminum undergo an exothermic reaction at brazing temperatures which permits brazing to occur. Cobalt and iron are also taught to be suitable substituents, in whole or in part, for nickel in this process, and that lead and/or bismuth are useful braze modifiers, also referred to as "wetting agents" or "surface tension modifiers" in the prior art.

Figure 1:
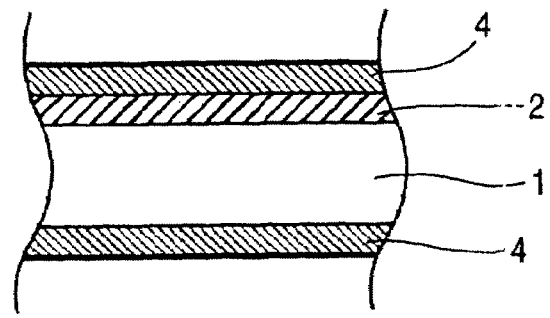
FIG. 1 shows schematically a brazing sheet in accordance with the prior art.

FIG. 1 schematically shows a brazing sheet in accordance with the prior art as would be obtained by the process disclosed in U.S. Pat. Nos. 3,970,237 and 4,028,200. The brazing sheet product consists of a core layer 1 clad on one or both sides with a cladding layer 2 comprising an aluminum-based brazing alloy. On top of the cladding layer 2 is applied a thin nickel-based braze-promoting layer 4, preferably a nickel-lead layer, by means of electroplating.

Figure 2:
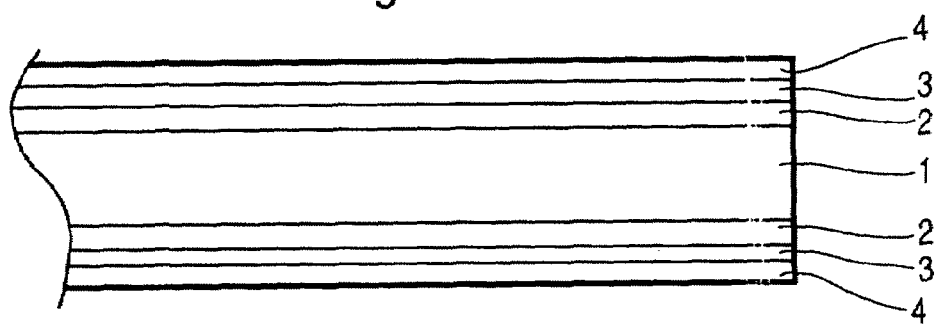
FIG. 2 shows schematically a brazing product according to a first preferred embodiment of the present invention, including a core layer.

FIG. 2 schematically shows a brazing product in accordance with a first preferred embodiment of the present invention. The brazing product according to the first preferred embodiment comprises a core layer 1 clad on one or both sides with a cladding layer 2 comprised of an aluminum-based brazing alloy, with a nickel-based braze-promoting layer 4 being applied on top of the cladding layer 2. Between the cladding layer 2 and the braze-promoting layer 4 is applied a bonding layer 3 which forms an effective bond between the cladding layer 2 and the braze-promoting layer 4. Although FIG. 2 shows layers 2, 3 and 4 on both sides of the core layer 1, it will be immediately apparent to the skilled person that they may also be applied on only one side of the brazing product.

The brazing product shown in FIG. 2 is representative of various articles of manufacture. For example, the brazing product of FIG. 2 may preferably comprise a brazing sheet which can be formed into a useful shape and brazed with one or more objects comprised of similar or dissimilar metals. In the alternative, the brazing product may comprise a brazing preform which may be interposed between similar or dissimilar metal components for subsequent brazing, and which may be in the form of a wire, rod, sheet, or shim. For example, the preform may be interposed between aluminum parts formed of unclad aluminum, for subsequent brazing. When heated to a sufficiently high temperature for a sufficient period of time, the cladding layer 2 bonding layer 3 and braze-promoting layer 4 are melted to form a filler metal which forms the braze joint between the parts being joined by brazing.

Figure 3:
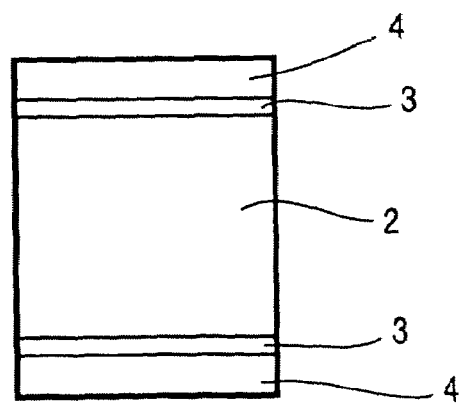
FIG. 3 shows schematically a brazing product in accordance with a second preferred embodiment of the present invention, not having a core layer.

FIG. 3 schematically shows a brazing product in accordance with a second preferred embodiment of the present invention in which the core layer 1 is omitted. In the embodiment of FIG. 3, a substrate comprised of an aluminum-based brazing alloy is interposed between bonding layers 3 and nickel-based braze-promoting layers 4. The brazing product according to the second preferred embodiment is particularly suitable for use as a brazing preform, and may be in the form of a wire, rod, sheet or shim.

The method according to the invention includes the step of conditioning the surface of an aluminum substrate so as to improve its ability to receive a braze-promoting layer of a metal such as nickel or cobalt, which metals are known to be difficult to plate directly on aluminum in a manner which preserves their ability to undergo exothermic reaction as discussed above.

Core Layer

As mentioned above, the aluminum substrate may include a core layer. The core layer has a melting point high enough that it does not melt during the brazing operation, and is preferably formed from aluminum or an aluminum alloy. In some preferred embodiments the core sheet also comprises magnesium to increase amongst others the strength of the core layer. The core may preferably contain magnesium in a range of up to about 8%, more preferably in a range of up to about 5.0 wt. %. The amount of magnesium in the alloy is highly variable, depending on the intended application of the brazing product, and may be at or below 0.05% for AA3003 alloy. In some applications, magnesium contents of about 0.5 to 5.0 wt. %, 0.2 to 5%, 0.5 to 2.5% or 0.2 to 2.0% may also be preferred.

Further alloying elements may be added to the core such as, but not limited to, Cu, Zn, Bi, V, Fe, Zr, Ag, Si, Ni, Co, Pb, Ti, Zr and Mn in suitable ranges. For example, the core may contain V in the range of 0.02 to 0.4% by weight to improve the corrosion resistance of the core alloy. Unless specifically indicated to the contrary, all percentages expressed herein are weight percentages.

Preferred aluminum alloys for use in the core layer are Aluminum Association AA3000-series alloys, with 3003 alloy and 3005 alloy being commonly employed as core materials in brazing products. The core materials of the brazing products according to the invention may also comprise other, less conventional, alloys such as Aluminum Association AA5000, AA6000 and AA7000-series alloys, depending on the application of the brazing product. For example, low-zinc content 7000-series braze sheets are used for high strength bracket applications.

Rather than being formed from aluminum or an aluminum alloy, the core may instead comprise titanium, titanium alloys, bronze, brass, copper, high strength steel, low carbon steel, stainless steel, nickel or nickel alloy steel. Some examples of stainless steels are as follows: stainless steel grades with 0.01 to 0.35% by weight of carbon and 11 to 27% by weight of Cr, as defined by the international standard steel numbers, like ferritic grades, for example ASTM 409, 410S, 430; martensitic grades, for example ASTM 420; duplex grades, for example ASTM 329, S31803; austenitic grades, for example ASTM 301, 304, 304L, 321, 316L; and heat and creep resisting grades, for example ASTM 309S, 304H. High strength steel typically has yield strengths in the range of 550 to 1100 MPa, tensile strength in the range of 585 to 1170 MPa, and an elongation in the range of 1 to 8. Among stainless steels, austenitic are preferred.

The core sheet has a thickness typically in a range of at most 5 mm, more preferably in the ranges of 0.1 to 2.5 mm, 0.1 to 2.0 mm or 0.2 to 2 mm.

Cladding Layer

The cladding forms part of the filler metal and therefore has a melting point below that of the core layer and the metal parts being joined by brazing. As mentioned above, the cladding layer preferably comprises an aluminum-based brazing alloy, and may preferably be applied to the core layer by roll bonding, cladding, Physical Vapor Deposition (PVD), Chemical Vapor Deposition (CVD), semi-continuous or continuous casting, spray forming or spray coating.

The aluminum-based brazing alloy of the cladding layer preferably comprises aluminum in combination with one or more alloying agents selected from the group comprising silicon, zinc, magnesium, and combinations thereof, such as aluminum-silicon, aluminum-silicon-magnesium, aluminum-silicon-zinc and aluminum-silicon-magnesium-zinc. The cladding may also include other alloying elements selected from the group comprising bismuth, lead, tin, nickel, beryllium, germanium, lithium, antimony, thallium, copper, manganese, indium, iron, zirconium, sodium, calcium and strontium. In one preferred embodiment of the invention, the cladding comprises an aluminum brazing alloy having the following composition (in weight percent):

| | |
|---|---|
| Si: | 2 to 18 |
| Mg: | up to 8.0 |
| Zn: | up to 5.0 |
| Cu: | up to 5.0 |
| Mn: | up to 0.30 |
| In: | up to 0.30 |
| Fe: | up to 0.80 |
| Sr: | up to 0.20 |
| At least one element selected from the group consisting of: | |
| Bi: | 0.01 to 1.0 |
| Pb: | 0.01 to 1.0 |
| Li: | 0.01 to 1.0 |
| Sb: | 0.01 to 1.0 |
| Impurities each up to 0.05, total impurities up to 0.20, balance aluminum. | |

Typically, the magnesium level in the clad layer does not exceed 2.0 wt. %, and is preferably in the range of about 0.1 to 2.0 wt. % or about 0.2 to 2.0 wt. %, when magnesium is present essentially only as a braze modifier.

In one preferred embodiment, the bismuth content of the aluminum clad layer has an upper limit of 0.5%. A suitable lower limit for the bismuth content is 0.01% and more preferably 0.05%.

In another preferred embodiment, the lithium content of the aluminum clad layer has an upper limit of 0.5%. A suitable range for the lithium content is 0.01 to 0.3%, depending on the application method and the metallurgy of the cladding layer.

In another preferred embodiment, the antimony content of the aluminum clad layer has an upper limit of 0.5%. A suitable range for the antimony content is 0.01 to 0.3%.

In another preferred embodiment, the aluminum clad layer comprises SI in the range of 2 to 18%, and preferably 5 to 14% or 7 to 18%, and further comprises magnesium in the range of up to 8.0%, preferably up to 6% and more preferably up to 5.0%. Depending on the application, magnesium may be present in the range of 0.5 to 8.0%, 0.1 to 5%, 0.2 to 5%, 0.5 to 5%, 0.5 to 2.5% or 0.05 to 3%. Further alloying elements may be added such as, but not limited to, Cu, Zn and Sr in suitable ranges. For example, zinc may be added in an amount of up to 5%, or in the range from 0.5 to 3.0%.

In another preferred embodiment, the aluminum clad layer comprises SI in the range of 2 to 18%, and preferably 7 to 18%, and further comprises zinc in the range of up to 5%. Preferably the zinc is in the range of 0.5 to 3%. Further alloying elements may be added such as, but not limited to, Mg and Cu in suitable ranges.

In another preferred embodiment, the aluminum clad layer comprises Si in the range of 2 to 18%, and preferably 7 to 18%, and further comprises copper in the range of up to 5%. Preferably the copper is in the range of 3.2 to 4.5%. Further alloying elements may be added such as, but not limited to, Mg and Zn in suitable ranges.

In some preferred embodiments, the aluminum clad layer may contain indium in a range of up to 0.30% as an alloying element to reach a more electronegative corrosion potential of the aluminum clad alloy as compared to the aluminum core alloy. Indium has been found to be much more effective in reducing the corrosion potential of the alloy as compared to zinc additions.

In some preferred embodiments, the aluminum clad layer may contain manganese and/or zirconium as impurity elements in a range of up to 0.30%, preferably up to 0.10% and more preferably up to 0.05%. It may also be preferred in some embodiments of the invention to have up to 0.50% manganese in the cladding layer.

In some preferred embodiments, the aluminum clad layer may contain iron as an impurity element in a range of up to 0.8%, and preferably in a range of up to 0.4%.

In some preferred embodiments, the aluminum clad layer may contain strontium in a range of up to 0.20% in order to modify the silicon present in the clad layer during the solidification when casting the clad alloy. A more preferred maximum for the strontium addition is up to 0.05%.

As mentioned above, the aluminum clad layer preferably comprises at least one or more elements selected from the group consisting of bismuth, lead, lithium and antimony, each in a range of 0.01 to 1.0%, and the combination of two or more of these elements does preferably not exceed 1.0%, and that magnesium may be present in a range of up to 2.0%, for example in the ranges 0.1 to 2.0% or 0.2 to 2.0%. The combination of magnesium with one or more other elements from this group does preferably not exceed 2.5%. In another preferred embodiment, the clad layer comprises one or more elements selected from the group comprising bismuth, lead, lithium and antimony, each in a range of 0.01 to 1.0%, and the combination of these elements preferably does not exceed 2.5%.

While magnesium may be present in the aluminum clad layer in amounts up to 8.0%, preferred ranges have been set out above to enhance amongst others the mechanical properties of the aluminum clad layer. It has also been found that magnesium in a range of up to 2.0% may also act as a braze modifier, and may reduce or eliminate the need to incorporate a conventional braze modifier such as bismuth, lead, lithium and antimony in the clad layer. Preferably the magnesium level in the clad layer does not exceed 2.0% when it is present essentially as a braze modifier in combination with a lead-free braze-promoting layer.

In accordance with the invention, it has been found that the braze-promoting layer itself does not need to comprise lead as an alloying addition. Good results can also be obtained if one or more elements of the group Bi, Pb, Li, Sb and Mg are added in the given ranges to the aluminum clad layer itself. In particular, the inventors have found that there is some synergistic benefit of the combination of magnesium in the cladding, with a nickel, nickel-lead or nickel-bismuth braze-promoting layer. As an example, adding lead to the aluminum clad layer has the advantage that the composition of the plating bath becomes less complex, which is a major achievement in itself, whereas the alloying addition to the cladding is very simple when manufacturing the clad layer. As a result the electroplated nickel layer applied may essentially consist of nickel and unavoidable impurities. From an operational and environmental point of view, bismuth is preferred over lead as an alloying element in the aluminum clad layer.

For brazing applications, the most preferred aluminum alloys for use in the cladding layer are Aluminum Association AA4000-series alloys, with 4045 and 4047 being particularly preferred alloys. Other alloys such as AA3000, AA6000 and AA7000-series alloys, may be useful where it is desired to provide a cladding having other properties such as corrosion resistance.

The thickness of the clad layer preferably ranges from about 2 to about 20% of the total thickness of the brazing product, eg. a brazing sheet in accordance with FIG. 2, which typically has a thickness of about 0.5 mm. Thus, the total thickness of the clad layer preferably ranges from about 10 microns to about 100 microns, more typically in the range of 40 to 80 microns, for example about 50 microns. Where the brazing product comprises a sheet or shim preform without a core layer, as in FIG. 3, it is preferably comprised of an AA4000-series alloy having a gauge in the range of up to about 3 mm, preferably in the range of about 0.4 to 2 mm.

The clad layer may preferably be coupled to the core via one or more intermediate layers (also referred to herein as "interlayers"), which may comprise aluminum or aluminum alloy, copper or copper alloy, zinc or zinc alloy.

Bonding Layer

The bonding layer also forms part of the filler metal, and forms an effective bond between the aluminum substrate and the braze-promoting layer comprising nickel, the bond remaining effective during subsequent deformation of the brazing sheet, for example by bending. The bonding layer may preferably be applied to the substrate by immersion plating, direct plating or by electroplating.

The bonding layer preferably comprises one or more metals selected from the group comprising zinc, tin, lead, bismuth, nickel, antimony, magnesium, lithium and thallium. It is believed that the bonding layer works in three ways. First, because the treatments used to apply the bonding layers, such as zincate and stannate treatments, are caustic and/or involve displacement, they "condition" the aluminum surface for brazing. That is, the zincate and stannate thin or re-structure the native aluminum oxide, to make it more amenable to brazing. This re-structured aluminum surface is then encapsulated with zinc (etc). Second, the bonding layer provides preferred nucleation sites for subsequent Ni deposition. Third, it resists the acidity of acidic Ni plating baths, thereby avoiding aluminum corrosion or contamination of the plated deposit, and to avoid poisoning or degrading the bath by dissolution effects.

The bonding layer may preferably be comprised of pure or substantially pure zinc, tin, lead or bismuth, or may be primarily zinc, tin, lead or bismuth (e.g. at least 50 weight %). Minor amounts of these or other elements may be present, as discussed in more detail below. Typically, such elements are present at less than 10%, more usually less than 5% by weight, and possibly less than 1%.

In some preferred embodiments, the bonding layer is comprised primarily of zinc or tin in combination with one or more additional elements selected from the group comprising bismuth, lead, lithium and antimony. The amount of the additional element or elements in total may be up to 50%, but preferably is less than 25%, e.g. In the range 1 to 25%.

As a practical matter, even impurity levels of elements such as lead and bismuth can be sufficient to have an positive effects on brazing, but the amounts of these elements are preferably controlled in continuous processes such that they are no longer considered impurities.

In one preferred embodiment, bismuth is present in a zinc or tin-based bonding layer in an amount of up to 10% to improve the wetting action during brazing.

The thickness of the bonding layer is preferably up to about 0.5 microns, more preferably up to about 0.3 microns, and most preferably in the range of 0.01 to 0.15 microns or 0.02 to 0.15 microns, with 0.03 microns being an example of a particularly preferred thickness.

As mentioned above, the bonding layer may be applied to the substrate by immersion plating. For example, where the bonding layer is zinc or tin-based, it is preferably applied by an immersion zincate or stannate treatment.

The zincate immersion bath may preferably comprise an alkaline solution comprising about 20 to 100 g/l zinc oxide and up to about 500 g/l sodium hydroxide. In some preferred embodiments, the amount of zinc oxide in the zincate bath may be in the range of about 40 to 50 g/l. In some preferred embodiments, the bath may contain about 400 to 500 g/l sodium hydroxide or about 60 to 250 g/l sodium hydroxide, with amounts of about 100 to 120 g/l being typical. A number of commercially available zincate baths can be used, for example Chemtec (tradename) 024202, also known as the Bondal process, and Chemtec (tradename) 24195, also known as a cyanide-free Bondal process.

Typical alkaline stannate solutions comprise 5 to 300 g/l sodium or potassium stannate and sodium hydroxide.

Preferably, the duration of the immersion plating treatment is in the range of about 1 to 300 seconds, more preferably about 10 to 60 seconds, and typically about 30 seconds. The temperature of the immersion plating bath is preferably in the range of from about 10 to 50° C., more preferably in the range of about 15 to 30° C. The immersion plating treatment is typically conducted at ambient temperature.

In one preferred embodiment of the invention, the application of the bonding layer is preceded by, or concurrent with, mechanical abrasion of the substrate, preferably, by brush cleaning the surface using commercially available flap brushes comprising nylon fibres impregnated with suitable ceramic particulates, or stainless steel brushes, such that the target surface defines a plurality of reentrant edges. It has been found by the inventors that brush cleaning the substrate significantly increases the rate of the immersion plating step.

The application of a bonding layer to the substrate is merely one of a number of "pretreatments" which can be used to promote adhesion of the braze-promoting layer and the underlying substrate. The adhesion of the braze-promoting layer to the aluminum substrate, for example the cladding of a brazing sheet product, may be improved by pre-treating the outer surface of the substrate on which the braze-promoting layer is being deposited. The pre-treatment preferably comprises a preliminary cleaning step during which the surface is made free from grease, oil, buffing compounds, rolling lubricants or slitting oils. This can be accomplished in many ways, for example by vapor degreasing, solvent washing, solvent emulsion cleaning, or by mild etching. Following, or instead of, the preliminary cleaning step, the surface of the substrate is pretreated by one or more of the following.

(a) acid desmutting in a solution comprising nitric acid (typically 25 to 50%), optionally in combination with a fluoride and/or chromic acid and/or sulfuric acid. Suitable sources for the fluoride can be, for example, hydrofluoric acid or ammonium bifluoride, see also e.g. "The Surface Treatment and Finishing of Aluminum and its Alloys", by S. Wernick et al., ASM International, 5th edition, 1987, vol. 1, pp. 181 to 182.

(b) mechanical preparation such as polishing, abrasion, brushing or grit blasting. It is known, for example, to apply brushing while the surface is in contact with a lower alcohol, such as for example isopropanol, see e.g. also U.S. Pat. No. 4,388,159.

(c) alkaline etching, see e.g. "The Surface Treatment and Finishing of Aluminum and its Alloys", by S. Wernick et al., ASM International, 5th edition, 1987, vol. 1, pp. 191 to 203.

(d) aqueous detergent cleaning.

(e) anodic oxidation, see e.g. "The Surface Treatment and Finishing of Aluminum and its Alloys", by S. Wernick et al., ASM International, 5th edition, 1987, vol. 2, pp. 1006 ff.

(f) electrograining or electrolytic cleaning.

(g) pre-treatments described for example in U.S. Pat. Nos. 4,741,811, 5,245,847 and 5,643,434.

(h) immersion processes such as the zincate and stannate immersion treatments described above. Also see "The Surface Treatment and Finishing of Aluminum and its Alloys", by S. Wernick et al., ASM International, 5th edition, 1987, vol. 2, chapters 14 and 15.

By the use of any of pretreatments (a) to (g) listed above, it may be possible to eliminate the bonding layer and directly apply the braze-promoting layer to the underlying substrate, usually an aluminum alloy brazing alloy.

Braze-Promoting Layer

The braze-promoting reacts or dissolves at brazing temperatures, and is incorporated in the filler metal together with the cladding layer and the optional bonding layer. In theory, the braze-promoting layer could be applied by electroplating, electroless plating, roll bonding, thermal spraying, plasma spraying, chemical vapor deposition (CVD), physical vapor deposition (PVD) or other techniques for depositing metal or metal alloys from a gas or vapour phase, although some of these methods would be impractical or difficult to control. Electroplating is the most preferred method for applying the braze-promoting layer according to the present invention.

The braze-promoting layer is comprised of one or more metals selected from the group comprising nickel, cobalt and iron. Preferably, the braze-promoting layer is nickel-based or cobalt-based. More preferably, the braze-promoting layer is nickel-based, and may preferably comprise pure nickel or nickel in combination with one or more alloying elements and/or impurities. Where the braze-promoting layer is nickel-based, it may preferably contain one or more alloying elements or impurities selected from the group comprising cobalt, iron, lead, bismuth, magnesium, lithium, antimony and thallium. Specific examples of nickel-based braze-promoting layers are nickel, nickel-bismuth, nickel-lead, nickel-cobalt, nickel-bismuth-cobalt, nickel-lead-cobalt, nickel-lead-bismuth, nickel-bismuth-antimony, etc.

In some preferred embodiment of a nickel-based braze-promoting layer, lead or bismuth is present in an amount of up to about 10%, preferably up to about 5%, and more preferably up to about 3%, although lower amounts and even trace amounts of these elements may also have a beneficial effect. For example, amounts of lead or bismuth as low as up to about 1.0%, about 0.01 to 1.0%, or about 0.01 to 0.05% may be beneficial.

Within the commercially available methods of applying braze-promoting layers, it may not be possible to directly apply reactive metals such as magnesium and lithium in unalloyed form in the braze-promoting layer, and it may be more practical to include them in one or more of the other layers making up the filler metal. However, it is preferred that they be present somewhere in the layers making up the filler metal so that they are available to assist in brazing. This being said, magnesium may preferably be present in the braze-promoting layer in an amount of from about 0.05 to 3.0%, and lithium may preferably be present in an amount of from about 0.01 to 0.5%.

In another preferred embodiment of a nickel-based braze-promoting layer, thallium is present in an amount of from 0.01 to 1.0%, although the use of thallium is preferably avoided due to its toxicity.

Where the clad layer comprises one or more wetting agents selected from the group comprising bismuth, lead, lithium, antimony or thallium in the amounts described above with reference to the clad layer, the incorporation of these elements into the braze-promoting layer can be partly or completely avoided. For example, where the cladding contains a wetting agent, bismuth and lead are either completely eliminated from the braze-promoting layer or their concentrations are reduced to no more than 0.01%, provided that the amounts of Bi and Pb are sufficiently controlled in practice to maintain consistent brazeability.

The thickness of the braze-promoting layer is preferably up to about 2.0 microns, more preferably up to about 1.0 microns, and even more preferably up to about 0.5 microns, and most preferably about 0.05 to 0.5 microns. A preferred minimum thickness of the braze-promoting layer is about 0.25 to 0.30 microns.

As mentioned above, the braze-promoting layer is preferably applied by electroplating. In one preferred embodiment of the invention, electroplating of the braze-promoting layer is conducted under the following conditions:

(a) electroplating bath temperature 20 to 70° C., preferably 20 to 30° C.;
(b) electroplating bath pH 4.0 to 12.0, more preferably pH 7.0 to 12.0, for example pH 10.0 to 12.0 and pH 10.5;
(c) current density of 0.1 to 15.0 A/dm$^2$, preferably 0.1 to 10.0 A/dm$^2$, and more preferably 0.5 to 4.0 A/dm$^2$;
(d) plating time 1 to 300 s, preferably 30 to 120 s, for example 100 s;
(e) bath composition comprising nickel sulfate and/or nickel chloride, sodium citrate, lead acetate and ammonium hydroxide.

The preferred bath composition set out above preferably includes 0 to 300 g/l nickel sulfate, more preferably 3 to 200 g/l nickel sulfate, even more preferably about 50 g/l to 70 g/l nickel sulfate.

The preferred bath composition set out above preferably includes 0 to 225 g/l nickel chloride, more preferably 10 to 100 g/l nickel chloride, even more preferably about 50 g/l nickel chloride.

The preferred bath composition set out above preferably includes 50 to 300 g/l sodium citrate, more preferably 60 to 300 g/l sodium citrate, even more preferably about 100 g/l sodium citrate, although 30 g/l sodium citrate is preferred in some embodiments. Sodium gluconate may be used instead or in combination with the sodium citrate, preferably up to 300 g/l, more preferably 60 to 300 g/l, even more preferably about 150 g/l.

The preferred bath composition set out above preferably includes 5 to 325 ml/l ammonium hydroxide (calculated as 30% ammonium hydroxide solution), more preferably 5 to 150 ml/l ammonium hydroxide, even more preferably about 75 ml/l ammonium hydroxide.

Where the braze-promoting layer contains lead, the preferred bath composition set out above preferably includes 0.05 to 10.0 g/l lead acetate, preferably 1.0 g/l lead acetate. As an alternative for the lead acetate, lead citrate may be used in an amount of 0.05 to 5 g/l, or about 0.05 to 1%, more preferably about 1.0 g/l.

Where the braze-promoting layer contains bismuth, the preferred bath composition set out above preferably includes about 0.05 to 5 g/l bismuth lactate, more preferably about 1.0 g/l bismuth lactate.

Where the braze-promoting layer contains cobalt, for example where the braze-promoting layer comprises nickel-cobalt or nickel-lead-cobalt, the preferred bath composition set out above may further comprise cobalt chloride in the range of 10 to 100 g/l, preferably 50 g/l.

In another preferred embodiment of the invention, the braze-promoting layer is applied by electroplating in an electroplating bath having a pH of about 8.1; and a bath composition comprising about 70 g/l nickel sulfate, 30 g/l nickel chloride, 120 g/l sodium citrate, 20 g/l sodium acetate, 15 g/l ammonium sulfate, 1 g/l lead acetate, and 30 ml/l ammonium hydroxide (calculated as 30% ammonia solution).

In another preferred embodiment of the invention, the braze-promoting layer is applied by electroplating in an electroplating bath having a pH about 7.8; and bath composition including about 70 g/l nickel sulfate, 30 g/l nickel chloride, 120 g/l sodium citrate, 20 g/l sodium acetate, 50 g/l ammonium chloride, 1 g/l lead acetate, and 30 ml/l ammonium hydroxide (calculated as 30% ammonia solution).

In another preferred embodiment of the invention, the braze-promoting layer is applied by electroplating in an electroplating bath having a pH about 7.6; and bath composition including about 150 g/l nickel chloride, 200 g/l sodium citrate, 20 g/l ammonium chloride, 1 g/l lead acetate, and 30 ml/l sodium hydroxide (calculated as 25% sodium hydroxide solution), and optionally including about 66 g/l sodium gluconate.

In another preferred embodiment of the invention, the braze-promoting layer is applied by electroplating in an electroplating bath having a pH about 7.6; and bath composition including about 150 g/l nickel chloride, 200 g/l sodium citrate, 20 g/l ammonium chloride, 1 g/l lead acetate, and 30 ml/l sodium hydroxide (calculated as 25% sodium hydroxide solution).

In another preferred embodiment of the invention, the braze-promoting layer is applied by electroplating in an electroplating bath having a pH about 6.4; and (b) bath composition including about 155 g/l nickel chloride, 1 g/l lead acetate, 154 g/l EDTA and 93 ml/l ammonium hydroxide (calculated as 30% ammonia solution).

In another preferrred embodiment of the invention, the braze-promoting layer is electroplated onto the substrate using a plating bath which is effective over a broad pH range of from about 3 to 12, more preferably from about 5 to 12, and which has the following composition:
(a) from about 3 to about 20% nickel sulfate;
(b) from about 3 to about 10% nickel chloride;
(c) from about 6 to about 30% of a complexing salt selected from the group comprising sodium citrate and sodium gluconate;
(d) from about 0.005 to about 1.0% of a lead salt selected from the group consisting of lead acetate and lead citrate; and
(e) ammonium, wherein the mole ratio of nickel:citrate:ammonium in the plating bath is about 1:0.5 to 1.5:1 to 6.

It will be appreciated that the lead salt may be eliminated or replaced by a suitable amount of a salt of another metal, such as bismuth, depending on the desired composition of the braze-promoting layer.

Alternatively, the braze-promoting layer is electroplated onto the substrate using an acidic plating solution. The following are preferred acidic plating conditions according to one embodiment of the invention:
(a) electroplating bath temperature 20 to 70° C., preferably 40 to 60° C. or ambient temperature;
(b) electroplating bath pH in the range of about 3 to 5, preferably about 4 to 5, more preferably about 4.8 to 5.2;
(c) current density of 0.1 to 10.0 A/dm$^2$, preferably 0.5 to 5.0 A/dm$^2$;
(d) plating time 1 to 300 seconds, preferably 20 to 100 seconds;
(e) bath composition comprising nickel sulfate, nickel chloride and boric acid.

The preferred acidic bath composition set out above includes up to 400 g/l nickel sulfate, preferably up to 300 g/l nickel sulfate; more preferably 5 to 400 g/l nickel sulfate, even more preferably 240 to 300 g/l nickel sulfate, although amounts of about 70 g/l are suitable in some bath compositions.

The preferred acidic bath composition set out above includes 10 to 100 g/l nickel chloride, preferably 30 to 60 g/l nickel chloride, more preferably 40 to 60 g/l nickel chloride.

The preferred acidic bath composition set out above includes 5 to 100 g/l boric acid, preferably 25 to 40 g/l boric acid.

In another preferred embodiment of the invention, the braze-promoting layer is applied under acidic conditions as follows:
(a) electroplating bath temperature 25 to 30 EC;
(b) electroplating bath pH in the range of 3.2 to 6.2, controlled with sulfuric, acetic or hydrochloric acid;
(c) current density of 50 mA/cm$^2$;
(d) plating time 1 to 300 seconds; and
(e) bath composition including about 100 g/l nickel chloride, 5 to 150 g/l sodium citrate, 1 g/l lead acetate and 5 to 100 g/l ammonium chloride, and optionally comprising about 30 g/l boric acid.

Alternatively, following application of the bonding layer according to the method of the invention, the nickel-based braze-promoting layer may be applied by electroplating in an acid solution comprising an alkylsulfonic acid electrolyte, preferably methanesulfonic acid.

Alternatively, following application of the bonding layer according to the method of the invention, the nickel-based braze-promoting layer is applied by electroplating in a sulfamate solution or, for example, in a lead sulfamate solution where the braze-promoting layer contains lead. Typically the sulfamate solution comprises 50 to 500 g/l nickel sulfamate, 0.05 to 30 g/l lead sulfamate, 15 to 50 g/l boric acid, and optional wetting agents. Bath temperatures are in the range of 20 to 70° C.

Alternatively, following application of the bonding layer according to the method of the invention, the nickel-based braze-promoting layer is applied by electroplating in a fluoborate or, for example, in a lead fluoborate (Pb(BF$_4$)$_2$) solution where the braze-promoting layer contains lead. Typically nickel fluoborate is present in the range 50 to 500 g/l, optionally lead fluoborate in the range of 0.5 to 30.0 g/l, and further optionally fluoboric acid in the range 1 to 50 g/l, boric acid 15 to 50 g/l, and further optionally a wetting agent. Bath temperatures are in the range of 20 to 80° C., and preferably 40 to 70° C. An advantage is that this solution, like some others here described, does not require the use of ammonium hydroxide.

Alternatively, following the application of the bonding layer according to the method of the invention, a nickel-lead braze-promoting layer is applied by electroplating in a bath comprising 50 to 500 g/l nickel acetate, 0.05 to 30 g/l lead acetate, 15 to 50 g/l boric acid, up to 200 ml/l glycolic acid (70%), 20 to 100 g/l sodium acetate, and optionally wetting agents.

According to another preferred embodiment of the invention, a nickel-bismuth braze-promoting layer is applied under the following conditions:
(a) electroplating bath pH in the range of 2.5 to 10;
(b) electroplating bath nickel ion concentration in a range of 10 to 100 g/l, and preferably in a range of 20 to 70 g/l;
(c) electroplating bath bismuth ion concentration in the range of 0.01 to 10 g/l, and preferably in the range of 0.02 to 5 g/l;
(d) electroplating bath citrate ion concentration in the range of 40 to 150 g/l, and preferably in the range of 80 to 110 g/l;
(e) electroplating bath gluconate ion concentration in the range of 2 to 80 g/l, and preferably in the range of 4 to 50 g/l;
(f) electroplating bath chloride or fluoride ion concentration in the range of 1 to 50 g/l, and preferably in the range of 1 to 30 g/l.

The nickel ion concentration in the electroplating bath can be provided via the addition of nickel chloride, nickel fluoborate, nickel sulfamate, nickel acetate or nickel sulfate, with nickel sulfate (NiSO$_4$.6H$_2$O) being preferred. At a too high level of nickel salt in the aqueous bath there is the risk of the crystallization of the salt in the solution, which might damage a continuous process. At too low levels the resultant bath becomes uneconomical due to too long plating times and low current density.

The bismuth ion concentration in the electroplating bath can be provided in various ways, preferably via the addition of one or more compounds from the group comprising bismuth carbonate (Bi$_2$(CO$_3$)$_3$), bismuth oxide (Bi$_2$O$_3$), bismuth citrate (BiC$_6$H$_5$O$_7$) and bismuth chloride (BiCl$_3$). Optionally some sodium hydroxide may be added also to regulate the pH of the aqueous bath. By using bismuth carbonate or bismuth oxide in the presence of nickel a suitable plating bath has been obtained which is stable at a very wide pH range. At too high levels of Bi ion concentration in the aqueous bath the resultant deposit has a undesired high Bi concentration. Preferably the Bi concentration in the resultant Ni—Bi layer on the brazing sheet product is not more than 5 percent by weight, and preferably not more than 3 percent by weight. At too low levels the resultant bath becomes uneconomical due to too long plating times and low current density.

In yet another preferred embodiment, the bath for electroplating the braze-promoting layer has the following composition:

(a) nickel sulfate in a range of 45 to 450 g/l, and preferably 90 to 315 g/l;
(b) chloride ion concentration in a range of 1 to 50 g/l, and preferably 1 to 30 g/l;
(c) sodium citrate in a range of 55 to 180 g/l, and preferably 110 to 150 g/l;
(d) sodium gluconate in range of 2 to 90 g/l, and preferably 5 to 55 g/l;
(e) ammonium sulfate in a range up to 270 g/l; and
(f) bismuth oxide in a range of 0.02 to 22 g/l, and preferably 0.05 to 11 g/l, or bismuth carbonate in a range of 0.03 to 29 g/l, and preferably 0.06 to 14 g/l.

The addition of an ion from the group comprising chloride and fluoride is required for inducing anode corrosion. A suitable source of chloride ion is nickel chloride ($NiCl_2.6H_2O$) in a range of up to 415 g/l, and preferably in a range up to 250 g/l.

($H^+$) or ($OH^-$) can be added to regulate the pH in a range of 2.5 to 10. The use of ammonium hydroxide should preferably be avoided in view of the generation of ammonia fumes.

Optionally for reducing stress in the braze-promoting layer, an ammonium ion concentration in a range up to 40 g/l, and preferably in range of 1 to 25 g/l, or a triethanolamine ion concentration in a range of up to 40 g/l, or combinations thereof, or other equivalent components may be added to the electroplating bath. Any soluble ammonium salt can be used as a source of $NH_4^+$.

Figure 7:
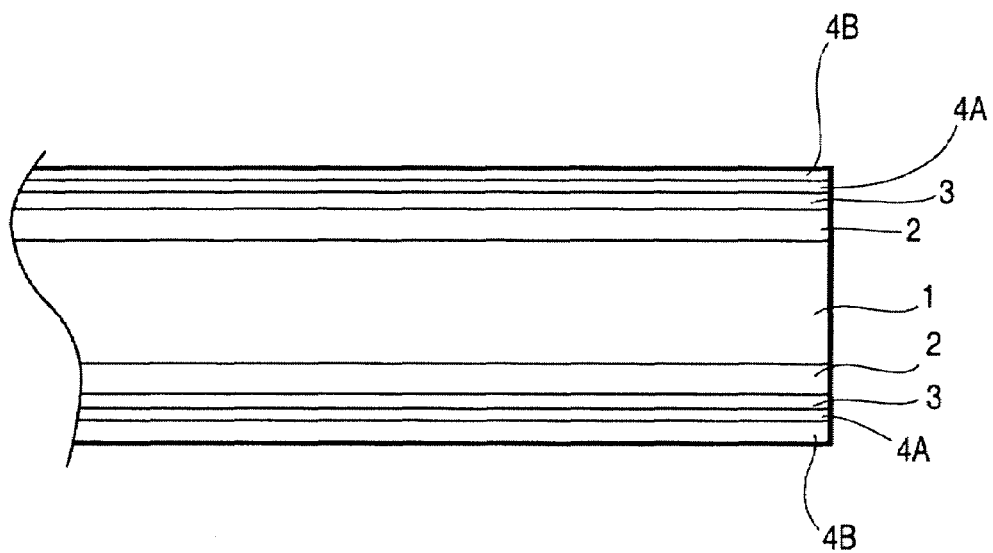
FIG. 7 is a brazing sheet according to an alternate preferred embodiment of the present invention.

Another preferred brazing product according to the invention includes two successively applied nickel-containing layers, either on top of a bonding layer or directly onto the underlying substrate. As described in the previous examples, it is possible to utilize a bonding layer of lead or bismuth, and a braze-promoting layer of nickel. In this case, the bonding layer serves the dual purpose of facilitating adherence, and acting as a wetting agent. It is also possible to codeposit nickel and lead or bismuth as a bonding layer, and then follow that deposit by nickel, again, for similar purpose. A preferable variation, illustrated schematically in FIG. 7, involves the use of a zinc (or tin) bonding layer 3, followed by a duplex layer which comprises an inner layer 4a including nickel and lead or nickel and bismuth and an outer layer 4b including nickel. By this variation, the bonding layer provides a good surface for nucleation for the following layers; the inner layer provides a desirable wetting agent, with nickel; and the outer layer provides the desirable braze-promoting metal, nickel, which can be applied in a high build bath without the need to accomodate lead, which as previously discussed, can complicate bath chemistry. Indeed, the "inner" and "outer" layers may preferably be reversed, such that the wetting agent is coated last, for example to avoid the potential for cross-contamination.

Filler Metal

As mentioned above, the filler metal melts during the brazing operation and is comprised of the cladding, optional bonding layer, and the braze-promoting layer. A certain amount of alloying with the core material or with an interlayer can also be expected. Normally the interlayer and the core material are aluminum-based, and thus dilute the melt somewhat with aluminum.

The filler metal as a whole preferably contains one or more of the following elements in the following amounts:

| | |
|---|---|
| Bi | 0.01 to 0.5%, preferably 0.05 to 0.5% |
| Mg | 0.05 to 3.0%, preferably 0.05 to 2.0% or 0.2 to 2.0% |
| Pb | 0.01 to 1.0% |
| Li | 0.01 to 0.5% |
| Sb | 0.01 to 0.5%, preferably 0.05 to 0.5% |
| Th | 0.01 to 1.0% |

Zinc may also preferably be present in the filler metal.

Additional Layers

It will be appreciated that further metal layers may be provided on top of the braze-promoting layer to improve certain properties of the brazing product according to the invention, including corrosion characteristics. This is discussed in greater detail below in the context of low temperature brazing.

Formation of Brazed Assemblies

The present invention is also directed to assemblies of components joined by brazing, and to methods of manufacturing such assemblies, wherein at least one of the components comprises a brazing product according to the present invention. The brazing product may preferably comprise a brazing sheet, a brazing preform, or a brazeable object formed from a brazing sheet or a brazing preform according to the present invention. A preferred brazeable object may comprise a component of a heat exchanger or a fuel cell, for example a heat exchanger plate, and the brazed assembly may preferably comprise a heat exchanger or fuel cell.

Brazing sheets to be incorporated into an assembly according to the invention preferably have a structure as shown in FIG. 2. Brazeable objects may be formed from such brazing sheets, for example by bending, stamping or roll forming.

In the normal course, it will be most economical to coat the braze-promoting layer, and if necessary, the bonding layer, upon brazing sheet in a continuous process using brazing sheet in roll form. Alternatively, it is contemplated that one or more of such coating steps could follow after the brazing sheet has been formed into objects to be rendered brazeable. This might be useful, for example, in circumstances wherein drastic mechanical deformation of the brazing sheet was required to form a part, and it was critical that a braze joint could be produced at the exact point of deformation; in such circumstances, a risk of delamination or cracking of the plating so as to increase the risk of oxidation of the coatings at the deformation point may exist, and so as to avoid the need to stress the performance characteristics of the process to ensure good adhesion even through such drastic deformation, it might be more economical to simply carry out the coating steps thereafter. It is also conceivable that the coating step could follow forming in circumstances wherein the additional materials handling costs (ie of coating each individual part as compared to continuous roll coating) were outweighed by the cost savings to be gained through reductions in coating material utilization, for example, in circumstances wherein by virtue of the shape of the parts, a great amount of waste metal is produced during stamping (which waste metal would otherwise have needlessly been coated).

Brazing preforms to be incorporated into an assembly according to the invention preferably have the structure shown in FIG. 2 or 3, and may be in the form of a wire, rod, sheet or shim provided with an optional bonding layer and/or a braze-promoting layer.

In one preferred embodiment, the brazing product comprises a brazing sheet, and the method for manufacturing a brazed assembly according to the invention comprises the steps of:
(a) shaping or forming parts of which at least one is made from the brazing sheet product of the invention as set out above;
(b) assembling the parts into the assembly;
(c) brazing the assembly under a vacuum or in an inert atmosphere in the absence of a brazing flux at elevated temperature for a period long enough for melting and spreading of the clad layer and all layers exterior thereto;
(d) cooling the brazed assembly.

Preferably, the non-oxidizing atmosphere is comprised of an inert gas, and preferably dry nitrogen.

Preferably, the brazed assembly is cooled during step (e) to a temperature less than 100° C. The cooling rate may be in the range of typical brazing furnace cooling rates. A typical cooling rate is at least 10° C./min or more.

Depending on the material, and particularly the aluminum alloy present in the core sheet, the process may include the further processing step (e) of aging the brazed and cooled assembly in order to optimize its mechanical and corrosion properties. The cooling rate of the brazed product may need to be adjusted to enable aging, i.e. faster cooling rates, as defined by furnace design and process particulars, may be necessary. Alternatively, aging may be achieved naturally or by a heat treatment.

In another preferred embodiment, the brazing product comprises a brazing perform in the form of a wire, rod, sheet or shim which is interposed between parts for subsequent brazing.

In yet another preferred embodiment, the brazing product comprises a brazing perform in the form of a wire or rod which is used in a method of welding together two or more structural elements. A weld joint is formed between the structural elements by melting a brazing perform according to the invention so as to form a filler metal at the weld joint during the welding operation.

In yet another preferred embodiment, the invention provides a method of manufacturing an assembly of brazed components in which at least two components of the assembly are dissimilar to each other, one of the components being a brazing product according to the invention. For example, dissimilar metals which may be joined to a brazing product according to the invention include aluminized metals such as aluminized or aluminum-coated steel; titanium; titanium alloys; plated titanium; coated titanium such as nickel coated titanium; copper and copper alloys such as bronze and brass; steels such as stainless steel, plated stainless steel, coated stainless steel, low carbon steel, plated low carbon steel, coated low carbon steel, high strength steel, coated high strength steel, plated high strength steel; nickel, nickel alloy and nickel alloy steel. The plated titanium and steels listed above may preferably be plated by copper or, in the case of titanium, by nickel, nickel-lead, nickel-bismuth, etc.

Some examples of stainless steels are as follows: stainless steel grades with 0.01 to 0.35% by weight of carbon and 11 to 27% by weight of Cr, as defined by the international standard steel numbers, like ferritic grades, for example ASTM 409, 410S, 430; martensitic grades, for example ASTM 420; duplex grades, for example ASTM 329, S31803; austenitic grades, for example ASTM 301, 304, 304L, 321, 316L; and heat and creep resisting grades, for example ASTM 309S, 304H. High strength steel typically has yield strengths in the range of 550 to 1100 MPa, tensile strength in the range of 585 to 1170 MPa, and an elongation in the range of 1 to 8. Among stainless steels, austenitic are preferred.

In another preferred embodiment, the brazing product according to the invention may be brazed to a dissimilar aluminum alloy, including any of the alloys mentioned above. In particular, the brazing product according to the invention can be brazed to free-machining versions of 6061 alloy known as 6062 which has deliberate additions of both Pb and Bi in amounts of about 0.4 to 0.7% each.

In one preferred embodiment, the present invention provides a method of manufacturing an assembly of components joined by brazing, comprising the steps of:
(i) forming said components of which at least one is made from a multi-layered brazing sheet product, said multi-layered brazing sheet product comprising a core sheet (a) having on at least one surface of said core sheet an aluminum clad layer (b), the aluminum clad layer being made of an aluminum alloy comprising silicon in an amount in the range of 2 to 18% by weight, preferably in the range of 5 to 14% by weight, a layer (c) comprising nickel on the outer surface of said aluminum clad layer, and a layer (d) comprising zinc or tin as a bonding layer between said outer surface of said aluminum clad layer and said layer comprising nickel;
(ii) forming at least one other component of a metal dissimilar to the core sheet of the multi-layered brazing sheet product and selected from the group consisting of titanium, titanium alloy, plated titanium, coated titanium, bronze, brass, stainless steel, plated stainless steel, coated stainless steel, nickel, nickel alloy, low carbon steel, plated low carbon steel, coated low carbon steel, high strength steel, coated high strength steel, and plated high strength steel;
(iii) assembling the respective components into an assembly such that the layer (c) comprising nickel of the multi-layered brazing sheet product faces in part or in whole the at least one other component of a metal dissimilar to the core sheet of the multi-layered brazing sheet product;
(iv) brazing the assembly under a vacuum or preferably in an inert atmosphere in the absence of a brazing flux at elevated temperature for a period long enough for melting and spreading of the aluminum clad layer and all layers exterior thereto;
(v) cooling the brazed assembly. The cooling rate may be in the range of typical brazing furnace cooling rates. Typical cooling rates are cooling rates of at least 10° C./min or more, and preferably of 40° C./min or more.

The method allows for the design and manufacture of brazed assemblies in which, for example a component made of titanium or plated or coated titanium, e.g. copper-plated, nickel-plated, nickel-lead-plated or nickel-bismuth-plated titanium, is bonded by means of brazing to one side of the multi-layered brazing sheet component having on both sides a layer (d) comprising nickel, which layer may be kept essentially lead-free, and whereby on the other side of the multi-layered brazing sheet a component made of plated or coated stainless steel or aluminum is bonded by means of brazing. The bonding achieved by means of brazing is reliable and has sufficient strength.

The method also allows for the design and manufacture of brazed assemblies in which a brazing sheet or brazing perform according to the invention is used to braze aluminum to aluminum or any aluminized metal; nickel coated titanium or steel to aluminum or to any aluminized metal; or nickel coated titanium or steel to nickel coated titanium or steel, by interposing the brazing sheet or brazing perform between the dissimilar metals.

As mentioned above, the brazing sheet products according to the invention can be shaped into parts used for heat exchangers and fuel cells, for example, the brazing sheet according to the invention can be used to prepare or assemble complex structures such as cans, prismatic cans, container, cells, or other parts used for heat exchangers of fuel cells.

In another preferred embodiment of the invention, the brazing sheet according to the invention can be used to prepare a composite rigid metal panel comprising at least two parallel metal plates and/or sheets secured to a stiffening panel. Preferably, the stiffening panel is made from a brazing sheet product according to the invention, and the parallel metal plates or sheets may be the same or dissimilar from each other an/or the stiffener panel.

The stiffener panel may preferably have a corrugated or honeycomb structure. The corrugations in the panel can be formed by roll forming, for example. The corrugated sheet can have v-shaped peaks and troughs, modified v-shaped with flattened peaks and troughs, or the peaks and troughs may have a dovetail shape or a curved shape. The honeycomb structure is preferably formed from two or more corrugated stiffener panels with flat peaks and troughs whereby the peak of one sheet is brazed to the trough of an adjacent sheet. The honeycomb structure will preferably be brazed in the same brazing operation as that which bonds the stiffener panel to the parallel metal plates or sheets. Furthermore, the use of the brazing sheet according to the invention for the manufacture of composite metal panels allows for a honeycomb core having various numbers of various density honeycomb portions, due to variations in densities or other cell sizes.

One preferred rigid metal panel according to the invention comprises a corrugated brazing sheet according to the invention which has the form of a turbulator sheet such as those used in the manufacture of heat exchangers. A preferred distance between corrugations (peaks) is about 20 mm, and a preferred height of the corrugations is about 8.5 mm.

Another preferred rigid metal panel according to the invention comprises a corrugated brazing sheet according to the invention which comprises a formed sheet having a plurality of cup-like cavities, which cup-like cavities are aligned in essentially parallel rows and whereby in alternating parallel rows the openings of the cup-like cavities are facing opposite directions. The tip surfaces of the cup-like cavities form the peaks or alternatively the troughs of the corrugated stiffener sheet, and the tip surfaces are joined by brazing to the parallel metal plates or sheets. The tip surfaces may be flattened in order to increase the contact surface area with the parallel metal plates or sheets, and thereby increasing the strength of the joint after brazing. The cup-like cavities may have several forms, such as circular, cylindrical, spherical or cone-shaped. Corrugated stiffener sheet of this type allows for the design and manufacture of composite metal panels with improved stiffness in multiple directions. Corrugated stiffener sheets having this structure are known in the art and are applied as heat shields in cars and trucks. In one preferred embodiment, the distance between adjacent cup-like cavities in the same row is about 10 to 30 mm, and the depth of the cup-like cavities is about 25 mm.

Brazing Products for "Low Temperature" Brazing

In another preferred embodiment, the invention provides brazing products, i.e. Brazing sheets and brazing preforms, which have a liquidus temperature below 570° C. Brazing, by definition, employs filler metal having a liquidus temperature above 450° C. and below the solidus of the base metal. Therefore, the low temperature brazing products according to the invention have a liquidus temperature in the range from above about 450° C. to below about 570° C., more preferably from about 490 to 570° C., and even more preferably from about 510 to 550° C.

At these temperatures, it is possible to braze alloys which are difficult or impossible to braze at conventional brazing temperatures, for example AA5000-series aluminum alloys having a magnesium content of up to about 6%, such as AA5052, AA5056, AA5083 and AA5059. The brazing product according to this embodiment of the invention may be applied in both vacuum brazing and fluxless brazing under controlled atmosphere conditions, but fluxless CAB is preferred.

The low temperature brazing products according to the invention comprise a brazing product according to the invention having a nickel-based braze-promoting layer, and separately deposited on one side of the braze-promoting layer is a metal layer comprising a metal which provides the filler with a liquidus temperature of about 490 to 570° C., and preferably about 510 to 550° C.

The separately deposited metal may be applied on top of the braze-promoting layer or underneath the braze-promoting layer, between the braze-promoting layer and the bonding layer, or between the braze-promoting layer and the substrate where the brazing product does not include a bonding layer. Preferably, the separately deposited metal layer is applied on top of the braze-promoting layer.

In one preferred embodiment, the separately deposited metal layer comprises copper or a copper-based alloy, and more preferably the layer comprises at least 60% by weight copper. Suitable copper-based alloys are brass and bronze. Preferably, the separately deposited metal layer has a thickness of at most 10 microns, more preferably at most 7 microns, and even more preferably has a thickness of about 4 microns.

Copper has been found to significantly reduce the liquidus temperature of the resultant metal filler. However, further metal layers may be applied in addition to the copper or copper-based layer. Such further layers may preferably be comprised of zinc or tin.

The layer comprising copper or copper-based alloy is preferably deposited by electroplating, but could instead be deposited by other techniques such as thermal spraying, plasma spraying, CVD, PVD or other known techniques for depositing metals or metal alloys from a gas or vapor phase.

One preferred low temperature brazing product according to the invention is characterized in that the filler metal, comprising the cladding layer and all layers exterior thereto, has a composition comprising at least, by weight percent:
(a) si in the range of 5 to 10%, preferably 7 to 10%;
(b) Cu in the range of 12 to 25%, preferably 12 to 18%;
(c) Bi in the range of at most 0.25%, preferably 0.02 to 0.25%;
(d) Ni in the range of 0.05 to 4%, preferably 0.05 to 3.0%;
(e) Zn in the range of at most 20%, preferably at most 10%, more preferably at most 0.25%, even more preferably at most 0.15%;
(f) Sn in the range of at most 5%; and
(g) Mg in the range of at most 5%;

the balance comprising aluminum and impurities.

A typical impurity element is iron present in the aluminum clad layer, which may be present in a range of up to about 0.8%. Other alloying elements or impurities may also be present in the filler metal, typically including the elements listed above which may be included as alloying elements or impurities in the cladding layer.

The filler metal composition described above has a liquidus temperature in the range of about 510 to 550° C.

A separately deposited metal layer comprising copper or copper alloy may preferably be deposited by electroplating the copper or copper alloy using an aqueous alkaline copper cyanide-based plating bath, which is operational in a wide pH range, and can be used on industrial scale plating lines using a high current density. The following is a preferred alkaline copper cyanide-based plating bath composition:

(a) copper phosphate in a range of 5 to 200 g/l, and preferably 20 to 150 g/l, with copper pyrophosphate being a preferred salt;

(b) potassium pyrophosphate in a range of 50 to 700 g/l, and preferably 150 to 400 g/l;

(c) optionally, citric acid in a range of 2 to 50 g/l, and preferably 4 to 25 g/l; and (d) optionally (OH⁻) can be added to regulate the pH in a range of 7 to 11.

The plating bath temperature is preferably in the range of about 30 to 70° C., and more preferably in the range of about 40 to 65° C. In this temperature range the ion mobility increases and there is no need to cool the plating bath to compensate for the heat generation during plating.

The following is another preferred alkaline cyanide plating bath composition according to the invention:

(a) about 110 g/l copper (I) cyanide;

(b) about 140 g/l sodium cyanide; and (c) about 90 g/l sodium carbonate;

at a current density of about 3 A/dm² and a temperature of about 50° C.

A further zinc layer may be electroplated on top of the copper or copper alloy layer using a conventional zinc sulfate plating bath.

A further tin layer may be electroplated on top of the copper or copper alloy layer using an aqueous tin electroplating solution, which may preferably comprise about 26.1 g.l Sn²⁺ ions, 15.5 g/l total Fe, 5.2 g/l sulfate and 210 g/l phenol sulfonic acid.

One particularly preferred low temperature brazing product according to this embodiment of the invention comprises a sheet or shim preform without a core layer, as in FIG. 3, which is preferably comprised of an AA4000-series alloy having a gauge in the range of up to about 3 mm, preferably in the range of about 0.4 to 2 mm.

In another preferred embodiment, the low temperature brazing product can be incorporated as a stiffener sheet in a composite metal panel as described above. The parallel metal plates or sheets of the composite panel can be made from aluminum alloys, such as but not limited to, from the AA3000-series alloys frequently used in conventional brazing operations, but also from for brazing more aluminum alloys which are not normally brazed, such as alloys from the AA5000-series having magnesium as an essential alloying element in a range of at most 6 weight percent, and also aluminum alloys from the AA6000-series. The composite metal panel may also be formed in a single brazing cycle from different metal combinations, for example one or more of the parallel metal sheets or plates may be comprised on one of the dissimilar metals listed above. In one preferred example, one parallel metal sheet or plate is made from copper plated stainless steel and the other parallel metal sheet or plate is made from low carbon steel, with the stiffener comprising a low temperature brazing sheet according to the invention.

In a further aspect of the invention, there is provided a method of manufacturing rigid composite metal panels as set out above. The method of manufacturing the rigid composite metal panel, includes the steps of:

(a) providing parts of at least two parallel metal plates and/or sheets and a corrugated aluminum stiffener sheet which is made from low temperature aluminum brazing sheet product of the invention set out above;

(b) assembling the parts into an assembly such that the aluminum stiffener sheet is arranged between the parallel metal plates and/or sheets;

(c) joining the assembly into a rigid composite metal panel by heating the assembly under a vacuum or in an inert atmosphere in the absence of a brazing flux material at elevated temperature of less than 600° C. for a period long enough for melting and spreading of the molten filler to form a joint between each of the parallel metal plates and/or sheets and the corrugated aluminum stiffener sheet; and (d) cooling of the joined composite metal panel.

In above method, fluxless CAB brazing is preferred.

EXAMPLES

The invention encompasses a novel plating process which provides for a functional braze-promoting layer. As one aspect, whereas U.S. Pat. No. 4,208,200 contemplates usefulness only in alkaline conditions [pH 7–12], with resultant production of offensive ammonia vapors, the bath of the present invention may be utilized also in acid conditions [pH 5–7], wherein ammonia vapors are reduced. So as to avoid corrosion of the aluminum substrate, and improve adhesion of the braze-promoting layer, a preplate (ie of zinc, tin, lead, bismuth, etc.) is advantageously provided in acid conditions. The preplate may be provided, but is not necessary, in alkaline conditions. The process is characterized by an aqueous bath comprising, in solution, one or more of nickel, iron and cobalt, along with acetates and gluconates. As one aspect, the bath is characterized by a pH range, as aforesaid, between 5–7. As another aspect, citrate and ammonium are provided in solution, and the mole ratio of nickel:citrate:ammonium in solution is about 1:0.5–1.5:1–6, which provides significant improvements in plating rates and bath life over the process described in U.S. Pat. No. 4,208,200. Preferred embodiments of the above bath are characterized in table 1, wherein same are identified as solutions 1–6. It will also be shown that the mole ratios of nickel:citrate:ammonium in solution can further extend to approximately 1:0.05–1.5:0.05–6.

For the purpose of understanding table 1, it should be understood that the values for bath life indicated were obtained using an accelerated life span test method. The method utilizes a nickel anode and aluminum cathode in a beaker containing 500–1000 ml of plating solution. Plating tests were run continuously using a stirred 800 ml plating solution for about 8 hours per day. Periodically small samples were plated for about 1 minute and then brazed in a furnace under nitrogen atmosphere at 1120° F. for 1 minute. Plating of nickel-lead on the aluminum continued each day until either a precipitate formed or a green gel formed on the anode.

TABLE 1

| Formula (grams/liter) | U.S. Pat. No. 4,028,200 | 1 | 2 | 3 | 4 | 5 | 6 |
|---|---|---|---|---|---|---|---|
| $NiSO_4 \cdot 6H_2O$ | 70 | 70 | 70 | | | | |
| $NiCl_2 \cdot 6H_2O$ | 30 | 30 | 30 | 155 | 150 | 155 | 155 |
| $Na_3$ Citrate · $2H_2O$ | 120 | 120 | 120 | 110 | 200 | 110 | |
| Na Acetate · $3H_2O$ | | 20 | 20 | | | | |
| $(NH_4)_2SO_4$ | | 15 | | | | | |
| $NH_4Cl$ | | | 50 | 100 | 20 | 100 | |
| $NH_4OH$ (ml 29%) | 30 | 30 | 30 | 146 | | 146 | |
| Lead Acetate | 1 | 1 | 1 | 1 | 1 | 1 | 1 |
| NaOH (ml 25%) | | | | | 30 | | 93 |
| EDTA | | | | | | | 154 |
| Na Gluconate | | | | | | 66 | |
| Solution pH | 8.1 | 8.1 | 7.8 | 7.8 | 7.6 | 7.8 | 6.4 |
| Bath Life (hours) | 4 | 12 | 50 | 95 | 50 | 187 | 100 |
| Plating Current $mA/cm^2$ | 20 | 20 | 30 | 80 | 30 | 80 | |

As will be evident from a review of table 1, each of the baths 1–6 provide significant improvements, either in deposition rate or bath life, or both, as compared to the bath described in U.S. Pat. No. 4,028,200. The chemical compositional limits identified in this patent have been shown to be limiting. Particularly, higher levels of acetate or chloride can be used than the respective limits of 10 g/l and 100 g/l described. In addition, EDTA and gluconate have been shown to be advantageous as lead and nickel complexing agents, and bath complexing agents. Further, solutions not containing citrate have been shown to be effective.

Without intending to be bound by theory, it is speculated that the improvements relate to preferred ratios of the components in the bath which provide for an equilibrium condition that is conducive to plating reactions, and less favourable to degradation of the bath. Particularly, it is believed that the baths of the present invention provide quantities of citrate sufficient to permit ready complexing of nickel dissolved from the anode, so as to substantially avoid passivation of the anode and precipitation of the newly dissolved nickel ions. Hydroxyl and sulfate ions are particularly deleterious in this regard since they carry a negative charge and are attracted by the anode. Plating efficiency and bath life are adversely affected by anode passivation. It should be noted that chlorides break down the passive layers and depolarize the anodes. Previously it was shown that citrate can be replaced by other strong complexing agents for nickel, however, there is some degradation in plating performance resulting from the tendency for such complexing agents to bind the nickel too tightly to participate in the plating reaction. It is also believed that the baths of the present invention provide quantities of ammonia sufficient to permit ready complexing of the nickel presented to the cathode. Ammoniacal nickel carries a positive charge due to the neutral charge of the ammonia molecule, regardless of the complex number. The positive charge of the ammoniacal nickel allows free and rapid transfer of the nickel to the negatively charged electrode surface. Ammonia then plays a second and crucial role of buffering the electrode surface as it is discharged from the complexed nickel molecule. The release of ammonia in part can form a gaseous phase which tends to detach and scrub the surface, especially of hydrogen gas bubbles, allowing rapid reintroduction of complexed nickel onto the surface. As well, ammonia buffers the surface environ such that hydroxyl ions generated through parasitic evolution of hydrogen cannot affect the quality of the nickel deposit. Recall that an abundance of hydroxyl ions can cause irreversible precipitation of the nickel species, resulting in decreased bath life, and codeposition of a hydrated nickel species that can adversely affect braze quality. It is well known that complexing agents are used to increase the solubility of a plated species. The strong complexing ability of citrate and ammonia for nickel increases and stabilizes the high nickel contents in the bath. However, it is further believed that the baths of the present invention present nickel bath formulations with citrate and ammonia that allow for suitably rapid transfer of complexing species from citrate, which predominates in the anodic boundary layer, to ammonia, which predominates in the cathodic boundary layer. The transfer occurs spontaneously in the bulk solution as the chemical system drives towards equilibrium. If the kinetics of the swapping reaction are rate-limiting the bath could suffer degradation. Alkaline baths suffer slightly due to the presence of dissolved gaseous ammonia which can volatize into the local air stream. The hazardous fumes can cause irritation and burning of mucous membranes and therefore require specialized containment and exhaust systems. Addition of a wetting agent including, but not limited to, lead, significantly improves the plating and brazing reactions in alkaline or mildly acidic solutions, and the brazing reactions in deposits obtained from more acid solutions. In alkaline or mildly acid solutions, lead is added as a soluble acetate species but is strongly complexed by citrate. The citrate stabilizes the lead ion in the bulk solution, presents the lead to the cathodic surface and effectively buffers the lead from precipitation with low solubility anions including, and predominantly, hydroxyl ion, as well as sulfate and chloride species during plating. The preferential plating of lead, bismuth, etc. or the purposeful deposition of lead nickel as a prestrike can increase the nucleation of nickel and therefore increase the coverage. This has far reaching implications allowing for decreased nickel consumption and an enhancement of braze quality and joint durability.

As per the work of Dockus in U.S. Pat. No. 4,028,200, it is known that the thickness of the braze-promoting layer is preferably about 0.1 to about 2.5% of the total thickness of the combination of the clad layer and the braze-promoting layer, for thin gauges such as those used commonly in heat exchanger construction [0.4 mm–0.75 mm]. If the amount of braze-promoter, such as nickel is deficient, the exothermic reaction will release insufficient heat to disrupt the oxide layer; if the amount is too large, it will react with the aluminum to form an excessive amount of aluminide compound, which is deleterious to bond formation and particularly, quality.

It has heretofore been understood that, provided uniform coverage was obtained, the thinnest zincate deposit possible was advantageous. However, such teachings were in the context of the plating of decorative nickel, and not in the context of braze-promoting nickel. It has been found, for bonding of a braze-promoting layer according to the present invention, the bonding layer should have a thickness of not more than 1 $\mu$m, preferably not more than 0.3 $\mu$m, and the braze-promoting layer should have a thickness of not more than 2.0 $\mu$m, preferably not more than 1.0 $\mu$m, again, for clad aluminum of the gauges generally utilized in the construction of heat exchangers.

It has also been found advantageous to incorporate certain alloying elements into the core or clad or bonding or braze-promoting layers, preferably in the core and/or cladding, as follows:

| | |
|---|---|
| Th | in the range 0.01 to 1.0% by weight |
| Bi | in the range 0.01 to 1.0% by weight |
| Mg | in the range 0.05 to 3.0% by weight |
| Li | in the range 0.01 to 0.5% by weight |
| Pb | in the range 0.01 to 1.0% by weight |
| Sn | in the range 0.01 to 1.0% by weight |
| Sb | in the range 0.01 to 1.0% by weight |

As previously indicated, Th, Bi, Sn, Sb and Pb are wetting agents, which improve the quality of the braze joint when incorporated in the cladding, or in the bonding layer or braze-promoting layer as taught herein. Mg and Li are known to enhance the braze and may be readily alloyed in the brazing sheet. Mg is of specific interest in the nickel braze reaction due to the probable volatization, even at approximately atmospheric pressures, and resultant enhanced disintegration of the oxide layer during or close in timing to the nickel reaction. The nickel will tend to delay oxidation or relase of the Mg through the aluminum oxide on the braze alloy surface until the point of reaction. The nickel reaction tends to occur quickly at the instance of first melting of the clad surface, especially due to the heat generated in the localized exothermic reaction of nickel and aluminum. If residual sites of poorly broken oxides persist, the Mg volatization can additionally and compoundly break down these persistent oxides resulting in improved joint formation. Li is known to reduce to the surface tension of molten aluminum which may beneficially affect the braze reaction and subsequent fillet formation during nickel reaction and Mg volatization.

Indeed, testing has established that, in brazing sheet incorporating a nickel-lead braze-promoting layer as per the present invention, the intentional incorporation of about 0.15–0.2 wt. % Mg in the cladding resulted in a 50–70° F. drop in the threshold temperature necessary to achieve satisfactory brazing. Incorporation of about 0.05% lithium resulted in a further 60–80° F. decrease. Further to these observations, brazing of coupons and formed plates yielded excellent braze results with the lithium or magnesium containing clads even when the magnesium reached levels approaching 2%.

It should be noted that the example baths were formulated with hydrated salts, where applicable, as follows;
nickel chloride hexahydrate, $NiCl_2.6H_2O$
nickel sulfate hexahydrate, $NiSO_4.6H_2O$
sodium citrate dihydrate, $C_6H_5Na_3O_7.2H_2O$
sodium acetate trihydrate, $C_2H_3NaO_2.3H_2O$
lead acetate trihydrate, $C_4H_6O_4Pb.3H_2O$ Other non-hydrated species in the example baths include but are not limited to;
ammonium sulfate, $(NH_4)_2SO4$
ammonium hydroxide, $NH_4OH$
sodium gluconate, $C_6H_{11}NaO_7$
stannous chloride, $SnCl_2$
antimony oxide, $SbO_3$
sodium hydroxide, $NaOH$
bismuth chloride, $BiCl_3$
bismuth trioxide, $Bi_2O_3$ Example 1

0.020" brazing sheet [H3190 core, clad on both sides with H4450 aluminum 10% silicon 0.15% magnesium] was mechanically brushed, tap water rinsed and nickel-lead plated in a bath including 155 g/l $NiCl_2.6H_2O$, 108.6 g/l sodium citrate, 100 g/l $NH_4Cl$, 140 ml $NH_4OH$ [29% solution], 1 g/l lead acetate [pH 7.8]. Coupons sectioned from the sheet were brazed. An excellent braze was observed.

Example 2

0.020" brazing sheet [Ravenswood K320 core, clad on both sides with CA43 clad, AA4045 plus 0.015% lithium] was caustic cleaned, tap water rinsed and nickel-lead plated in a bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 be $NH_4OH$] at 25 mA/cm$^2$ for 120 seconds. An excellent braze was observed.

Example 3

0.020" brazing sheet [Ravenswood K326 core, clad on both sides with CA28 clad, AA4343 plus 0.04% lithium] was caustic cleaned, tap water rinsed and nickel-lead plated in a bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 be $NH_4OH$] at 25 mA/cm$^2$ for 120 seconds. An excellent braze was observed.

Example 4

0.0236" brazing sheet [K324 core, clad on both sides with aluminum 12% silicon, 1.75% magnesium] was caustic cleaned, tap water rinsed and nickel-lead plated in a 35° C. alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 be $NH_4OH$] at 25 mA/cm$^2$ for 120 seconds. Components for a transmission oil cooler were stamped, assembled and brazed. An excellent braze was observed.

In the event that corrosion properties of the clad layer are desired to be modified, it is contemplated that the clad layer may contain by weight zinc in an amount in the range of up to about 5%. Manganese or other functional alloying ingredients may also be included in the clad layer as typical in commercial brazing sheet.

Braze tests were carried out to demonstrate the foregoing. In each test, braze quality was determined by placing the flat, cut end of an AA3003 O-temper aluminum tube [0.65" ID×0.75" OD, cut to 0.5" length and ground flat] on a 2"×3" coupon of No. 12 brazing sheet [total thickness 0.020", core 3003 aluminum, clad on both sides with nominal 10% ie 0.002" AA4343 aluminum (7.5% nominal silicon)] and heating the arrangement in a preheated furnace in a flowing nitrogen atmosphere to 1100° F. for a dwell time of less than 1 minute at maximum temperature. Braze quality was recorded as excellent, good, fair or poor, based on visual attribute data such as fillet size, wetting characteristics, surface appearance, lustre, etc.

Example 5

The coupon was caustic cleaned for 45 seconds, tap water rinsed, deoxidized in Oakite L25 for 10 seconds, tap water rinsed and nickel-lead plated in a bath including 70 g/l $NiSO_4.6H_2O$, 35 g/l $NiCl_2.6H_2O$, 120 g/l sodium citrate, 50 g/l $NH_4Cl$, 45 ml $NH_4OH$ [29% solution], 2 g/l lead acetate [pH 7.6] at 75 $mA/cm^2$ for 45 seconds. An excellent braze was observed.

Example 6

The coupon was caustic cleaned for 45 seconds, tap water rinsed, deoxidized in Oakite L25 for 10 seconds, tap water rinsed and nickel-tin plated in a bath including 70 g/l $NiSO_4.6H_2O$, 30 g/l $NiCl_2.6H_2O$, 120 g/l sodium citrate, 50 g/l $NH_4Cl$, 40 g/l sodium acetate, 20 ml $NH_4OH$ [29% solution], 1 g/l $SnCl_2$ [pH 7.3] at 75 $mA/cm^2$ for 40 seconds. An excellent braze was observed.

Example 7

The coupon was caustic cleaned for 45 seconds, tap water rinsed, deoxidized in Oakite L25 for 10 seconds, tap water rinsed and nickel-antimony plated in a bath including 70 g/l $NiSO_4.6H_2O$, 30 g/l $NiCl_2.6H_2O$, 120 g/l sodium citrate, 50 g/l $NH_4Cl$, 20 g/l sodium acetate, 30 ml $NH_4OH$ [29% solution], 1 g/l $SbO_3$. A poor braze was observed.

Example 8

The coupon was caustic cleaned for 45 seconds, tap water rinsed, deoxidized in Oakite L25 for 10 seconds, tap water rinsed and nickel-lead plated in a bath including 150 g/l $NiCl_2.6H_2O$, 200 g/l sodium citrate, 20 g/l $NH_4Cl$, 10 ml lead acetate solution [pH 7.6, by NaOH] at 25 $mA/cm^2$ for 120 seconds. An excellent braze was formed.

Example 9

The coupon was caustic cleaned for 45 seconds, tap water rinsed, deoxidized in Oakite L25 for 10 seconds, tap water rinsed and nickel-lead plated in a bath including 155 g/l $NiCl_2.6H_2O$, 108.6 g/l sodium citrate, 100 g/l $NH_4Cl$, 140 ml $NH_4OH$ [29% solution], 1 g/l lead acetate [pH 7.8] at 25 $mA/cm^2$ for 120 seconds. An excellent braze was observed.

Example 10

The coupon was caustic cleaned for 45 seconds, tap water rinsed, deoxidized in Oakite L25 for 10 seconds, tap water rinsed and (a) nickel-bismuth plated in a bath including 155 g/l $NiCl_2.6H_2O$, 120 g/l sodium citrate, 100 g/l $NH_4Cl$, 80 ml $NH_4OH$ [29% solution], 1 g/l bismuth chloride [pH 7.4]. Not tested since bismuth precipitated. (b) nickel-bismuth plated in a bath including 155 g/l $NiCl_2.6H_2O$, 120 g/l sodium citrate, 66 g/l sodium gluconate, 100 g/l $NH_4Cl$, 80 ml $NH_4OH$ [29% solution], 1 g/l bismuth chloride [pH 7.5]. An excellent braze was formed.

Example 11

The coupon was caustic cleaned for 45 seconds, tap water rinsed, deoxidized in Oakite L25 for 10 seconds, tap water rinsed and nickel-lead plated in a bath including 500 ml nickel sulfamate bath, 15 ml $NH_4OH$ [29% solution], 15 ml lead acetate solution [pH 6] at 25 $mA/cm^2$ for 120 seconds. A fair braze was observed.

It has been shown that brazing can be accomplished on coupons which are plated at pH values as low as approximately pH=2.2 as observed in the following baths containing EDTA. Later examples will show nickel/citrate/ammonia bath formulations that can plate at pH values of approximately pH=4.

Example 12

The coupon was caustic cleaned for 45 seconds, tap water rinsed, deoxidized in Oakite L25 for 10 seconds, tap water rinsed and (a) nickel-lead plated in a bath including 155 g/l $NiCl_2.6H_2O$, 161 g/l EDTA, 100 g/l NaOH, 1 g/l lead acetate [pH 6.4] at 25 $mA/cm^2$ for 120 seconds. No nickel deposit was detected and no braze occurred. (b) nickel-lead plated in a bath including 155 g/l $NiCl_2.6H_2O$, 155 g/l EDTA, 167 ml $NH_4OH$ [29% solution], 1 g/l lead acetate [pH 6.5] at 25 $mA/cm^2$ for 120 seconds. A good braze was observed. (c) nickel-lead plated in a bath including 155 g/l $NiCl_2.6H_2O$, 155 g/l EDTA, 136 ml $NH_4OH$ [29% solution], 1 g/l lead acetate [pH 2.2] at 25 $mA/cm^2$ for 120 seconds. A good braze was observed.

It is well known that the tenacious oxide on aluminum alloys prevents direct brazing without surface modification. Further it has been shown that coating with a traditional zincate bonding layer cannot alter the surface sufficiently to enable brazing as shown in the following example.

Example 13

As a control, a brazing sheet coupon was immersed in 10 wt. % w/w Oakite 360 etch solution at ambient temperature for 45 seconds; tap water rinsed; deoxidized in 4% v/v Oakite Deox PD-60-FC 22 for 7 seconds; tap water rinsed; and immersed for 30 seconds in an alkaline zincate solution including 50% w/w sodium hydroxide and 100 g/l zinc oxide to form a uniform zinc coating of approximately 0.2 $\mu$m. The AA3003 tube was not treated prior to arrangement on the coupon. Upon heating, poor brazing (no braze) was observed. A similar test was carried out in relation to a coupon immersed in zincate solution for 60. Again, poor brazing (no braze) was observed, which substantiates the need for a braze-promoting layer.

As previously indicated, it is known to utilize the Watts bath to provide a decorative nickel coating on aluminum. Utilization of the conventional Watts bath would overcome the problem of ammonia release, since inter alia the Watts bath contains no ammonia. However, it is conventional to utilize copper as a preplate; zinc is also known as a possibility, but the Watts bath is known to be difficult to control in the context of a zinc-coated aluminum substrate, and moreover, is not amenable to the inclusion of lead, bismuth or thallium, which can reduce plating rate. These difficulties of the conventional Watts bath are demonstrated with reference to the following examples.

Example 14

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and (a) nickel plated in a traditional Watts bath including 200 g/l $NiSO_4.6H_2O$, 40 g/l $NiCl_2.6H_2O$, 30 g/l $H_3BO_3$ [pH 4.8–5.2, ambient temperature] at 30 $mA/cm^2$ for 60–90 seconds. The tube was not treated prior to arrangement on the coupon. A poor to fair braze was observed. Black streaks and darkened edges were observed after 60 seconds and the nickel coating was non-uniform. (b) nickel-lead plated in the Watts bath with lead acetate added and plated at similar conditions, a fair to good braze was observed. The plating bath became cloudy.

Since it is desirable to produce a bath that does not release ammonia fumes, it is counter-intuitive to incorporate ammonia into a Watts bath. However, it is evident that the aforementioned discovery of the particular advantages provided by ammonium in nickel plating, and the preferable mole ratios to achieve equilibrium, have inherent application also in acidic conditions. Thus, the invention also comprises an improved Watts-type process that is robust for use with coated aluminum substrates and amenable to the incorporation into the plate of lead, bismuth or thallium, where said elements are not present in sufficient quantities in the coating to effectively serve as wetting agents in the braze. The improved process is characterized by an aqueous bath comprising nickel and ammonium in solution, and an acid sufficient to adjust the pH of such bath to acidic conditions, preferably, between about 3–7. Preferably, the acid is based on either or both of the anions of the nickel and ammonium in solution. A strong nickel chelating agent is also preferably provided, such as citrate and optionally EDTA. Advantageously, acetate and/or gluconate will be present to complex wetting agents such as bismuth and lead. The acidic conditions result in the predominance of ammonium ions in solution. The presentation of ammonium ions with soluble hydrated nickel can shift the equilibrium making ammoniacal nickel available to the cathodic surface and as shown in the alkaline baths, results in improved plating kinetics and bath life. Regardless of the presence of a highly acidic bulk solution, the buffering effect is enhanced at the cathode surface, reducing the propensity for hydroxide formation. Acid solutions can be prone to parasitic formation of hydrogen and the ammonia can effectively reduce the rate of hydrogen evolution by displacement from the surface of the cathode of the hydrogen proton and water. Citrate incrementally improves the nature of the nickel and/or nickel-lead deposit, even in small quantities, by stabilizing these species in the acidic environ. Particular embodiments are described in the following examples, the usefulness of which will be evident.

Example 15

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and (a) nickel plated in a modified Watts bath including 150 g/l $NiSO_4.6H_2O$, 30 g/l $NH_4Cl$, 30 g/l $H_3BO_3$ [pH 4.8–5.2, by concentrated $H_2SO_4$, ambient temperature] at 50 $mA/cm^2$ for 60–90 seconds. The tube was not treated prior to arrangement on the coupon. A good braze was observed, (b) nickel-lead plated in the Watts bath with lead acetate added and plated at similar conditions, a good to excellent braze was observed. The plating bath became cloudy.

Example 16

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and nickel-lead plated in a (a) modified Watts bath including 150 g/l $NiSO_4.6H_2O$, 30 g/l $NH_4Cl$, 30 g/l sodium citrate, 30 g/l $H_3BO_3$, 1.2 g/l lead acetate [pH 4.8–5.2, by concentrated $H_2SO_4$, ambient temperature] at 50 $mA/cm^2$ for 60–90 seconds. The tube was not treated prior to arrangement on the coupon. An excellent braze was observed, (b) modified Watts bath including 150 g/l $NiSO_4.6H_2O$, 30 g/l $NH_4Cl$, 30 g/l sodium gluconate, 30 g/l $H_3BO_3$, 1.2 g/l lead acetate [pH 4.8–5.2, by concentrated $H_2SO_4$, ambient temperature] at 50 $mA/cm^2$ for 60–90 seconds. The tube was not treated prior to arrangement on the coupon. An excellent braze was observed.

That is not to say that the traditional alkaline nickel or nickel-lead plating baths cannot also be utilized with the zincate bond layer as indicated by the following example.

Example 17

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and (a) nickel plated in a bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$ [pH 8.2, by 18 be $NH_4OH$] at 30 $mA/cm^2$ for 60 seconds. The tub was not treated prior to arrangement on the coupon. A good braze was observed, (b) nickel-lead plated in an alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 be $NH_4OH$] at 30 $mA/cm^2$ for 60 seconds. The tube was not treated prior to arrangement on the coupon. An excellent braze was observed.

As noted previously, nickel/citrate/ammonium plating formulations can effect a braze joint at moderately low pH values, even when the citrate composition drops to very low values.

Example 18

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and (a) nickel plated in a bath including 100 g/l $NiCl_2.6H_2O$, 70 g/l sodium citrate, 30 g/l $NH_4Cl$ [pH 4, by HCl] at 50 $mA/cm^2$ for 60 seconds. The tube was not treated prior to arrangement on the coupon. A good braze was observed, (b) nickel-lead plated in an alkaline bath including 100 g/l $NiCl_2.6H_2O$, 70 g/l sodium citrate, 30 g/l $NH_4Cl$, 1.2 g/l lead acetate [pH 4, by HCl] at 50 $mA/cm^2$ for 70 seconds. The tube was not treated prior to arrangement on the coupon. An excellent braze was observed.

Example 19

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating, tap water rinsed, and (a) nickel-lead plated in a bath including 100 g/l $NiCl_2.6H_2O$, 5 g/l sodium citrate, 30 g/l $NH_4Cl$, 1.2 g/l lead acetate [pH 4, by HCl] at 50 $mA/cm^2$ for 60 seconds. The tube was not treated prior to arrangement on the coupon. A good braze was observed. (b) nickel-lead plated in a bath including 100 g/l $NiCl_2.6H_2O$, 150 g/l sodium citrate, 30 g/l $NH_4Cl$, 1.2 g/l lead acetate [pH 4, by HCl] at 50 mA/cm$^2$ for 60 seconds. The tube was not treated prior to arrangement on the coupon. An excellent braze was observed.

Similar test were carried out in relation to a coupons immersed in lead or bismuth solutions for 20 and 30 seconds, respectively.

Example 20

The coupon was immersed for 30 seconds in a solution [ambient temperature] including 1.25% sodium hydroxide, 0.125% sodium gluconate and 1.0% lead acetate and nickel plated in a Watts bath [pH 3.8] including 262 g/l nickel sulfate, 45 g/l nickel chloride, 30 g/l boric acid at 25.5 mA/cm$^2$ for 2 minutes to a thickness of 0.82 μm. The tube was not treated prior to arrangement on the coupon. An excellent braze was observed.

Example 21

The coupon was cleaned by immersion for 45 seconds in a solution containing 10% caustic, 1% sodium gluconate, tap water rinsed, immersed for 20 seconds in an ambient solution including 62.5 g/l sodium hydroxide, 1 g/l sodium gluconate, 0.6 g/l Bi$_2$O$_3$, tap water rinsed, nickel plated in a 35° C. alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, [pH 8.2, by 18 be NH$_4$OH] at 25.5 mA/cm$^2$ for 120 seconds. The tube was not treated prior to arrangement on the coupon. A good braze was observed.

Example 22

The coupon was cleaned by immersion for 45 seconds in a solution containing 10% caustic, 1% sodium gluconate, tap water rinsed, immersed for 20 seconds in an ambient solution including 250 g/l sodium hydroxide, 4 g/l sodium gluconate, 2.5 g/l Bi$_2$O$_3$, tap water rinsed, nickel plated in a 35° C. alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, [pH 8.2, by 18 be NH$_4$OH] at 25.5 mA/cm$^2$ for 120 seconds. The tube was not treated prior to arrangement on the coupon. An excellent braze was observed.

It is further shown that stannate coatings offer excellent braze performance as a bonding layer for nickel plating.

Example 23

The coupon was immersed for 2 minutes in a tinning solution [170° F.] including 45 g/l sodium stannate, 7.5 g/l sodium acetate then nickel-lead plated in an alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] at 30 mA/cm$^2$ for 2 minutes. The tube was not treated prior to arrangement on the coupon. An excellent braze was observed.

Of course, in circumstances wherein the bonding layer is lead, bismuth or thallium, the need for further lead in the braze-promoting layer is not present, such that lead can be omitted from the Dockus bath. As previously discussed, the bonding layer can consist entirely of zinc, tin, lead, bismuth, nickel, antimony and thallium, or combinations thereof. As such, the bonding layer can be a codeposit of, for example, zinc with lead, bismuth or thallium, or nickel with lead, bismuth or thallium, or zinc with nickel, or tin with nickel. Thus, as one aspect of the invention, it is contemplated that the bonding layer itself will contain by weight an amount up to 100% in total of one or more elements selected from bismuth, lead, thallium and antimony, balance zinc or tin. The following example is illustrative.

Example 24

The coupon was etched in 10 wt. % Oakite 360 solution at ambient temperature for 45 seconds, tap water rinsed, deoxidized in 4% Oakite Deox PD-60-FC-22 for 7 seconds, tap water rinsed coated to a uniform zinc-lead coating by immersion for 10 seconds in a solution including 50 g/l ZnO, 10 g/l PbCO$_3$, 250 g/l NaOH, 3.5 g/l tartaric acid, 0.44 g/l FeCl$_3$ and approx. 10 g/l EDTA and nickel plated in an alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, [pH 8.2, by 18 be NH$_4$OH] at 60 mA/cm$^2$ for 60 seconds at ambient temperature. The tube was not treated prior to arrangement on the coupon. An excellent braze was observed.

Example 25

The coupon was immersed in (100 g/l sodium hydroxide, 50 g/l sodium potassium tartrate, 2 g/l iron chloride, 1 g/l sodium nitrate, 10 g/l ZnO, 2–3 g/l Bi$_2$O$_3$) for 10–20 s at ambient temperature. Followed by water rinsing, thence, nickel plating for 2 min at 25 mA/cm$^2$ using 70 g/l nickel sulfate, 30 g/l nickel chloride, 120 g/l sodium citrate, 20 g/l sodium acetate, 15 g/l ammonium sulfate and 30 ml ammonium hydroxide at pH 8.1. An excellent braze was observed.

This method can be embodied in various articles of manufacture, such as a brazing preform, ie a substrate of brazing alloy [aluminum having alloying agents so as to have a lower melting point than the aluminum components which are intended to be brazed]. Typical alloying agents include silicon, present at 2–18 wt. %, zinc, and magnesium, and combinations thereof, such as aluminum-magnesium-silicon, aluminum-zinc-silicon and aluminum-magnesium-silicon-zinc, formed in a wire, rod or sheet form and coated with the bonding layer and thence with braze-promoting layer, which may be interposed between aluminum parts formed of unclad aluminum, for subsequent brazing. Exemplary brazing preforms are shown schematically in FIG. 2, including a core layer, and in FIG. 3, in which no core layer is present.

The usefulness of such preforms is made evident with reference to the following examples:

Example 26

An untreated 0.004" substrate of 4047 alloy (12% silicon) was interposed between a coupon of AA3003 sheet and a tube of o-temper 3003 tube, and the arrangement was placed in a preheated furnace and heated in a nitrogen atmosphere to 1100° F., dwell time of less than 1 minute. No braze was observed.

Example 27

A substrate as per example 18 was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate, nickel-lead plated in a 35° C. alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] at 30 mA/cm$^2$ for 120 seconds. The tube was not treated prior to arrangement on the coupon. Good brazing was observed.

Figure 9A:
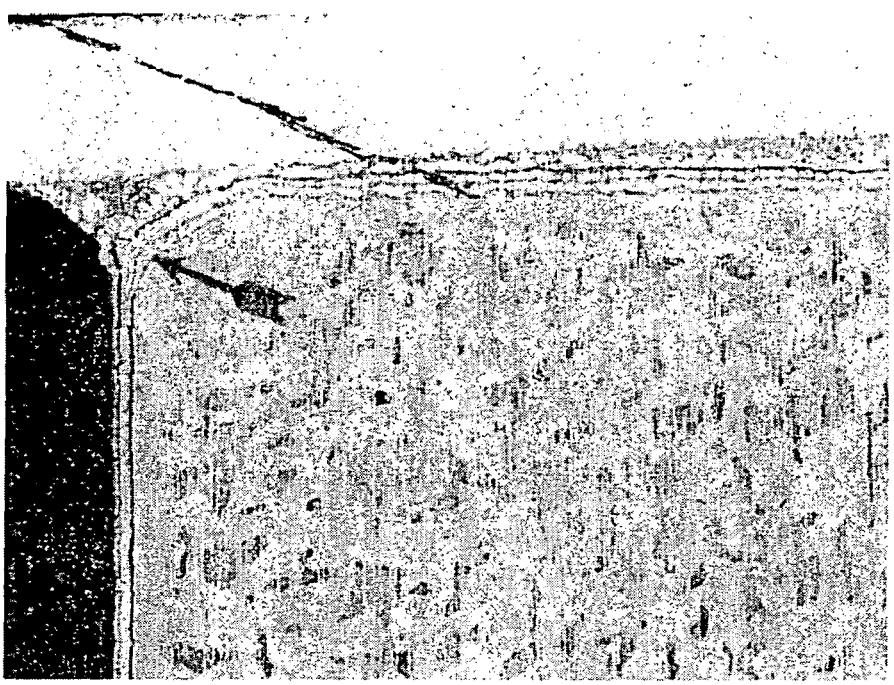
FIG. 9 is a braze joint formed between an Ivadized steel fitting and nickel plated brazing sheet.
Figure 9B:
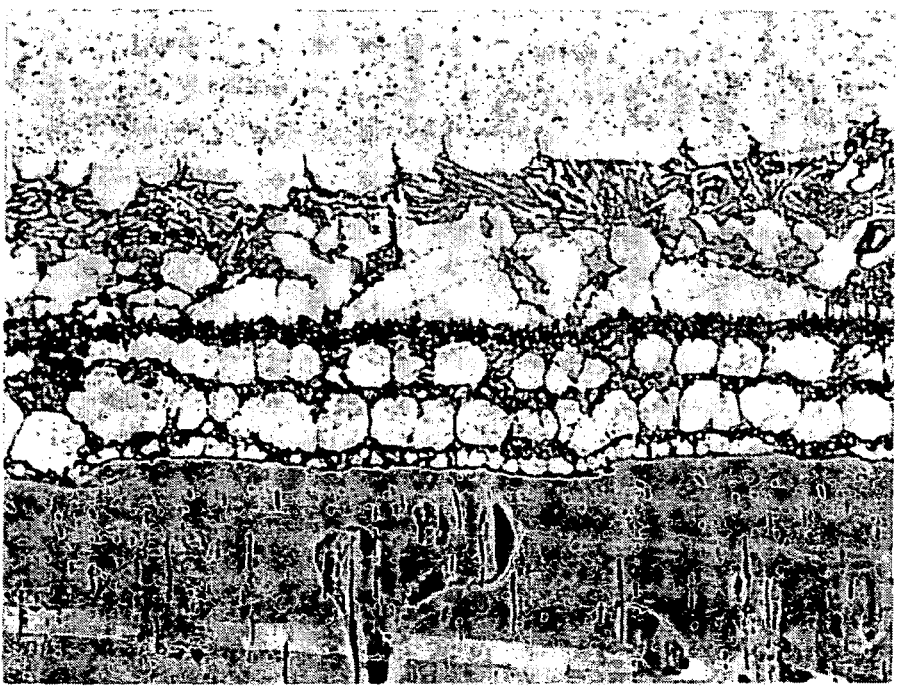
Figure 10:
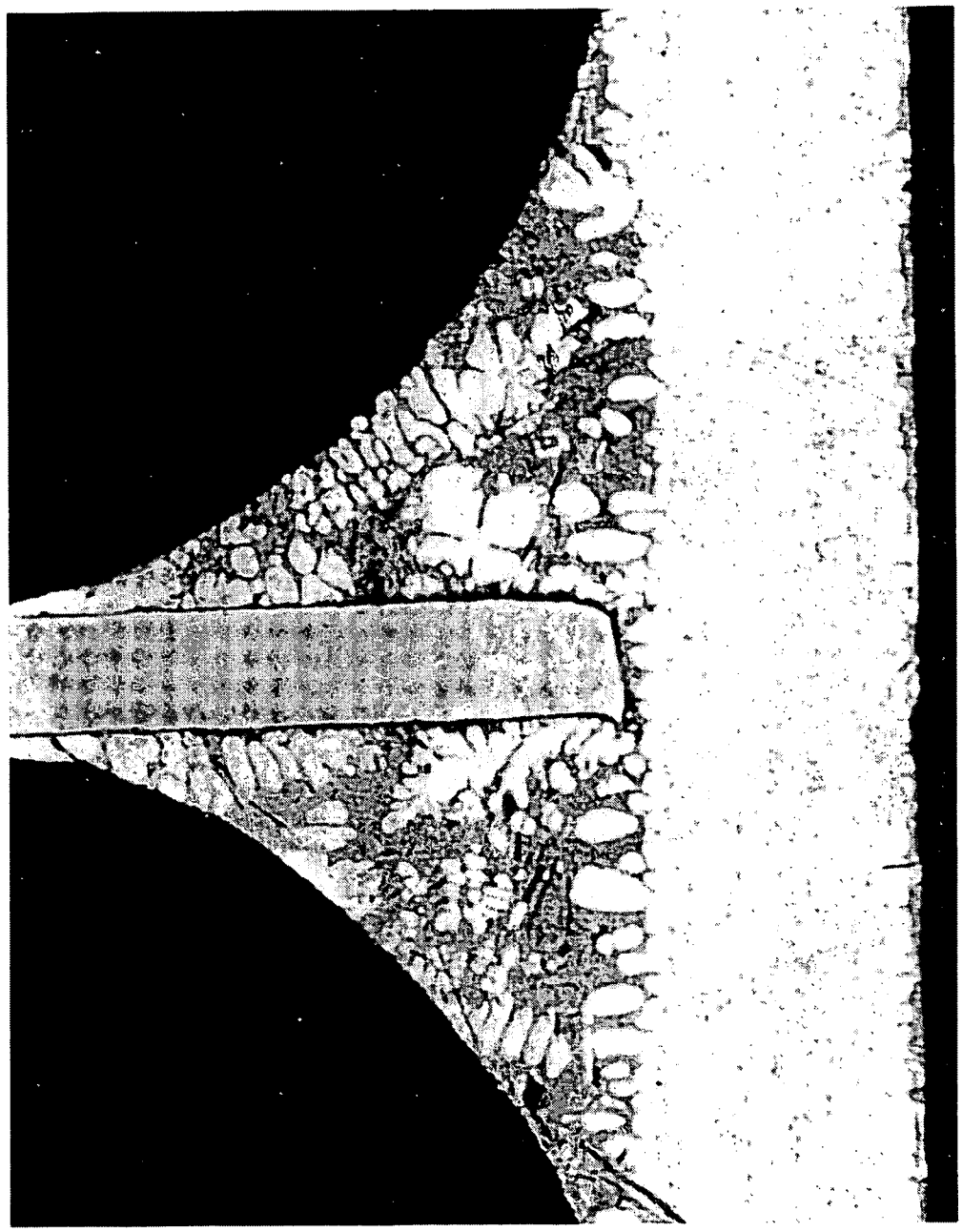
FIG. 10 is a braze joint formed between a roll bonded Feran sheet and nickel plated brazing sheet.
Figure 11A:
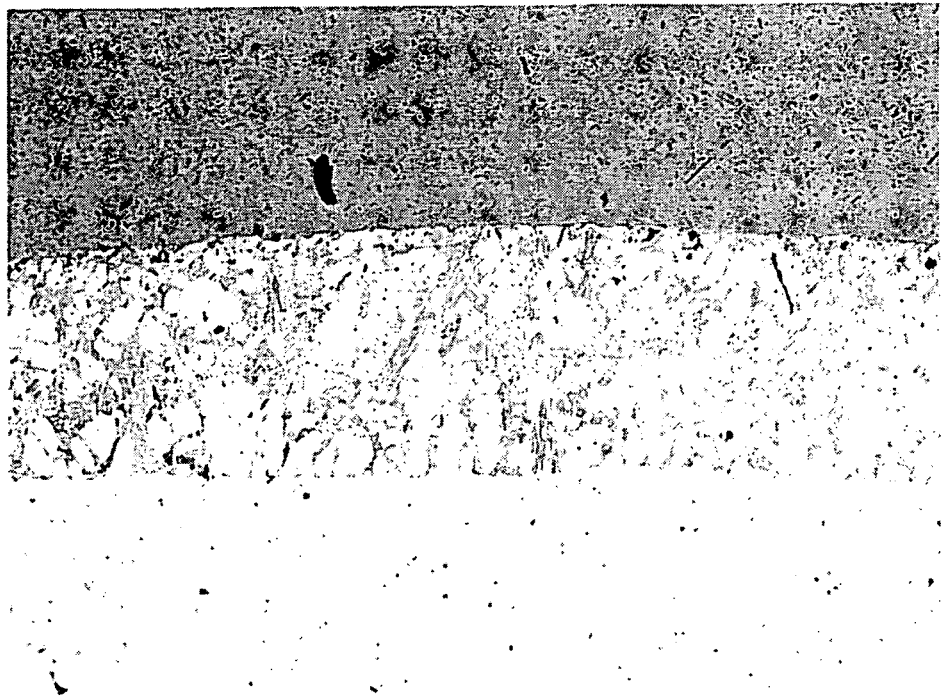
FIG. 11 is a braze joint formed between nickel plated titanium mesh and nickel plated brazing sheet.
Figure 11B:
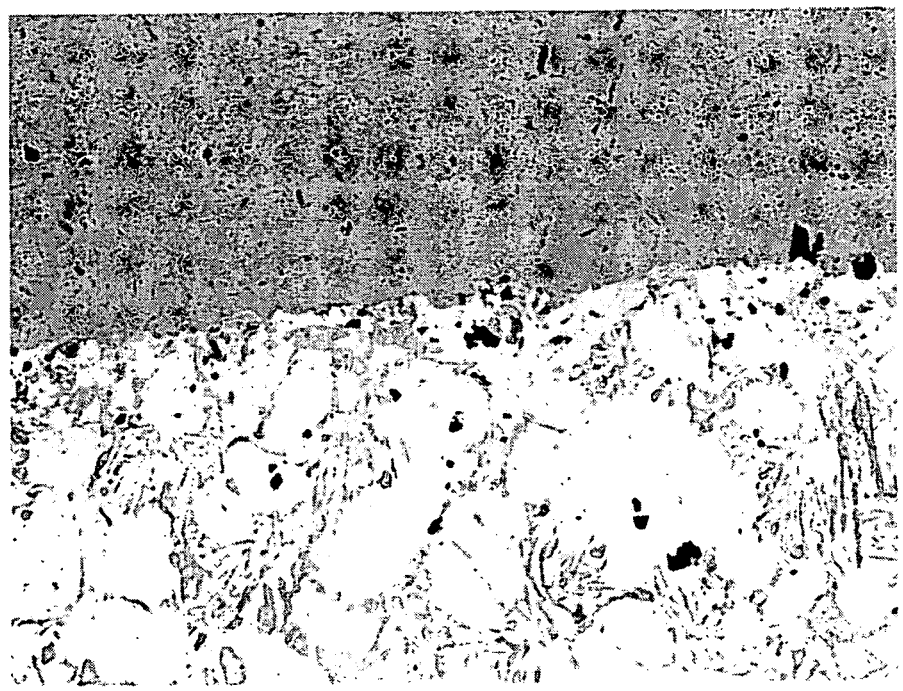

It has also unexpectedly been found that the brazing preform can be used to braze aluminum to aluminum or to any aluminized metal; nickel-coated titanium or steel or stainless steel to aluminum or to any aluminized metal; and nickel-coated titanium or steel or stainless steel to nickel-coated titanium or steel or stainless steel. Example braze joint structures on variously coated materials are shown in FIGS. 9–11.

Example 28

A titanium plate sample was acid cleaned in a dilute HF solution for 20 seconds and nickel-lead plated in a bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] at 20 mA/cm$^2$ for 20 seconds, tap water rinsed and dried. The plate was sandwiched between two 0.006" No 12 braze sheet coupons [clad with AA4343] nickel-lead plated in a bath including 155 g/l NiCl$_2$.6H$_2$O, 108.6 g/l sodium citrate, 100 g/l NH$_4$Cl, 140 ml NH$_4$OH [29% solution], 1 g/l lead acetate [pH 7.8] at 25 mA/cm$^2$ for 120 seconds and brazed at 1120° F. An excellent braze was observed.

Example 29

A titanium mesh sample was acid cleaned in a dilute HF solution for 20 seconds and nickel-lead plated in a bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] at 20 mA/cm$^2$ for 20 seconds, tap water rinse and dry. The mesh was sandwiched between two braze sheet coupons [Ravenswood K319 core, clad with AA4045+0.15% magnesium] nickel plated in a bath including 155 g/l NiCl$_2$.6H$_2$O, 108.6 g/l sodium citrate, 100 g/l NH$_4$Cl, 140 ml NH$_4$OH [29% solution], 1 g/l lead acetate [pH 7.8] at 25 mA/cm$^2$ for 120 seconds and brazed at 1120° F. An excellent braze was observed. The titanium mesh acts as a reinforcement between the braze sheets, producing a strong, composite structure.

Example 30

A roll bonded Feran™ sheet [Wickeder Wesffalenstahl Ust3 steel core, 5% clad both sides with aluminum 0.8 silicon alloy] was cleaned and sandwiched between two No 12 braze sheet coupons [clad with AA4343] which were nickel-lead plated in a bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] and brazed. An excellent braze joint was formed.

Example 31

An lvadized™ [IVD, ion vapour deposition] steel fitting was cleaned and mated to a No 12 braze sheet coupon [clad with AA4343] which was nickel-lead plated in a bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] and brazed. An excellent braze joint was formed.

However, more commonly, as schematically illustrated in FIG. 2, the method will be embodied in a brazing sheet product having a brazing sheet substrate, comprising an aluminum core 1 and a clad layer of brazing alloy 2; a bonding layer 3 on the clad layer 2 and a braze-promoting layer 4 on the bonding layer, which may be formed into a useful shape and brazed with similar objects. The usefulness of such brazing sheet products will be made evident with reference to the examples which follow.

Example 32

For experimental convenience, plates for an engine oil cooler were initially stamped from 0.028" #12 brazing sheet; immersed in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; and nickel plated in a solution including 142 g/l nickel sulfate, 43 g/l ammonium sulfate, 30 g/l nickel chloride, 140 g/l sodium citrate and bismuth [Bi$_2$O$_3$ was dissolved in HCl and pipetted into bath—approximates 1–2 g/l of the soluble bismuth salt] at 65 mA/cm2 at for 90 s. Excellent brazing results were observed.

Example 33

0.028" brazing sheet [modified 3005, clad on both sides with 4045+0.2% Mg] was immersed for 45 seconds in heat bath ZA-3-9 commercial zincating solution; tap water rinsed; dried; recoiled; and nickel plated in a 35° C. alkaline bath including 70 g/l NiSO$_4$.6H$_2$O, 30 g/l NiCl$_2$.6H$_2$O, 120 g/l sodium citrate, 20 g/l sodium acetate, 15 g/l (NH$_4$)$_2$SO$_4$, 1.2 g/l lead acetate [pH 8.2, by 18 be NH$_4$OH] at 25 mA/cm$^2$ for 120 seconds. Components for a transmission oil cooler were stamped, assembled and brazed under production conditions which involved a braze cycle similar to that described in examples 1–11. An excellent braze was observed. Experimental testing established that, once zinc plated, the coil could be stored for a reasonable time period and then nickel plated without adverse effect.

While it is possible that substrates of a type suitable for direct deposition of the braze-promoting layer, that is, including core, clad and bonding layers, is now or will at some point be made commercially available, the method, of course, encompasses the preliminary step of applying the bonding layer on a "target" surface of a substrate, such as the surface of a conventional brazing sheet.

Figure 8:
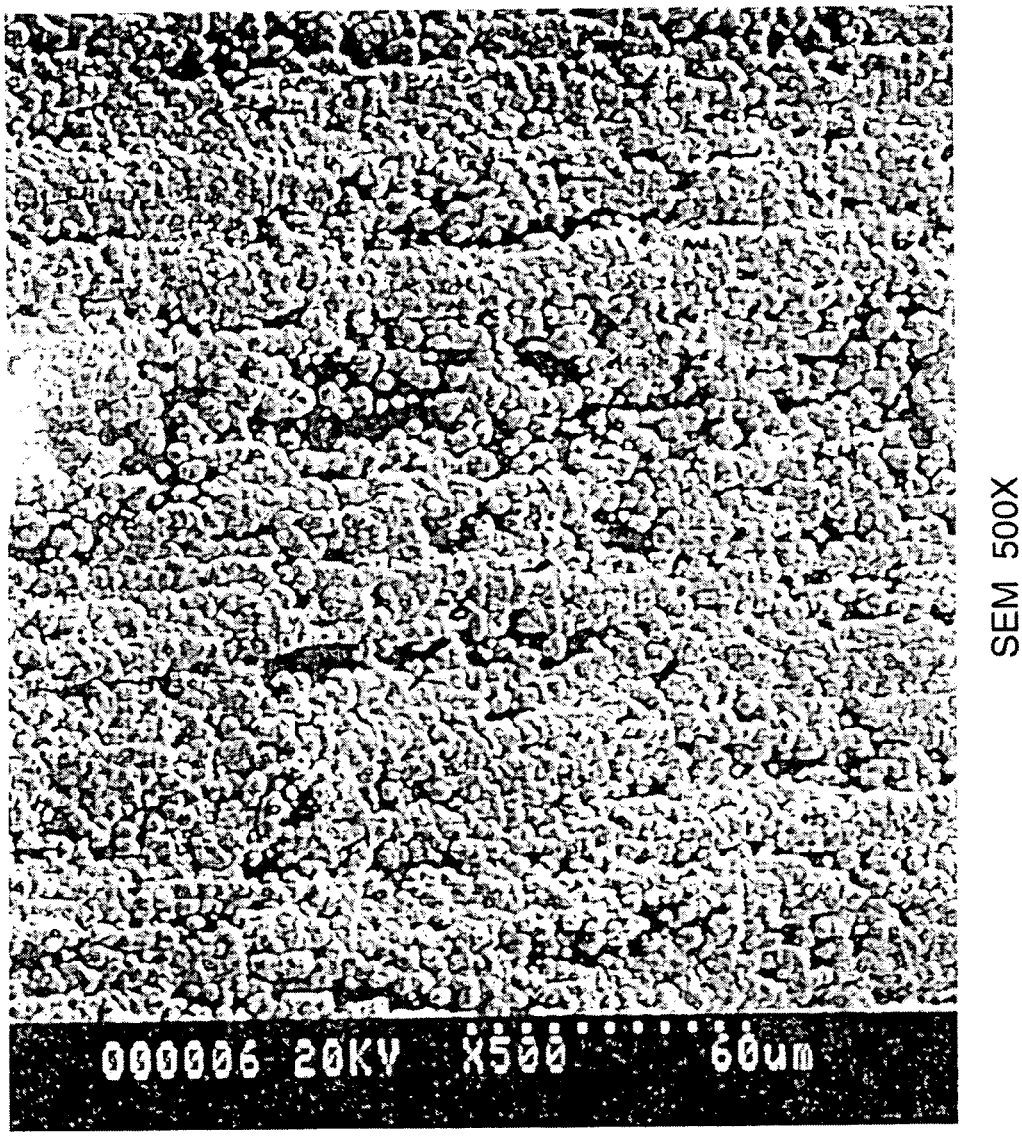
FIG. 8 is an SEM image of the surface of a brazing sheet subsequent to nickel plating in the presence of brush cleaning.

The bonding layer may be applied in any one (or more) of a variety of conventional application steps which are obvious to persons of ordinary skill in the plating arts. However, it has been unexpectedly found that if the method is extended such that the application of the bonding layer is preceded by a mechanical abrasion of the substrate, preferably, by brush cleaning the surface using commercially available flap brushes comprising nylon fibres impregnated with suitable ceramic particulates, or stainless steel brushes, such that the target surface defines a plurality of reentrant edges, it is possible to significantly increase the plating rate, as evidenced by the examples which follow. The sem micrograph of a mechanically brushed surface and nickel plated surface of brazing sheet alloy in FIG. 8 shows the excellent coverage and conformance to brush striations.

Example 34

A coupon was mechanically abraded using a stainless steel brush, immersed in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate for 15–20 seconds to form a uniform zinc coating and nickel plated in a 35° C. alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 be $NH_4OH$] at 25 $mA/cm^2$ for 60 seconds. An excellent brazing joint was observed.

Example 35

A series of coupons as per example 22 were zincated as per example 22 in the absence of a mechanical abrasion or any other surface treatment, to determine the equivalent time needed to achieve the same uniform zinc coverage. A uniform zinc coating was not observed until 30 seconds had elapsed.

In another aspect of the invention, it has also been unexpectedly found that the aforementioned mechanical abrasion step conditions the surface of an aluminum substrate so as to improve its ability to directly receive a braze-promoting layer of a metal such as nickel or cobalt as deposited, inter alia, through the process described in U.S. Pat. No. 4,028,200.

Figure 4:
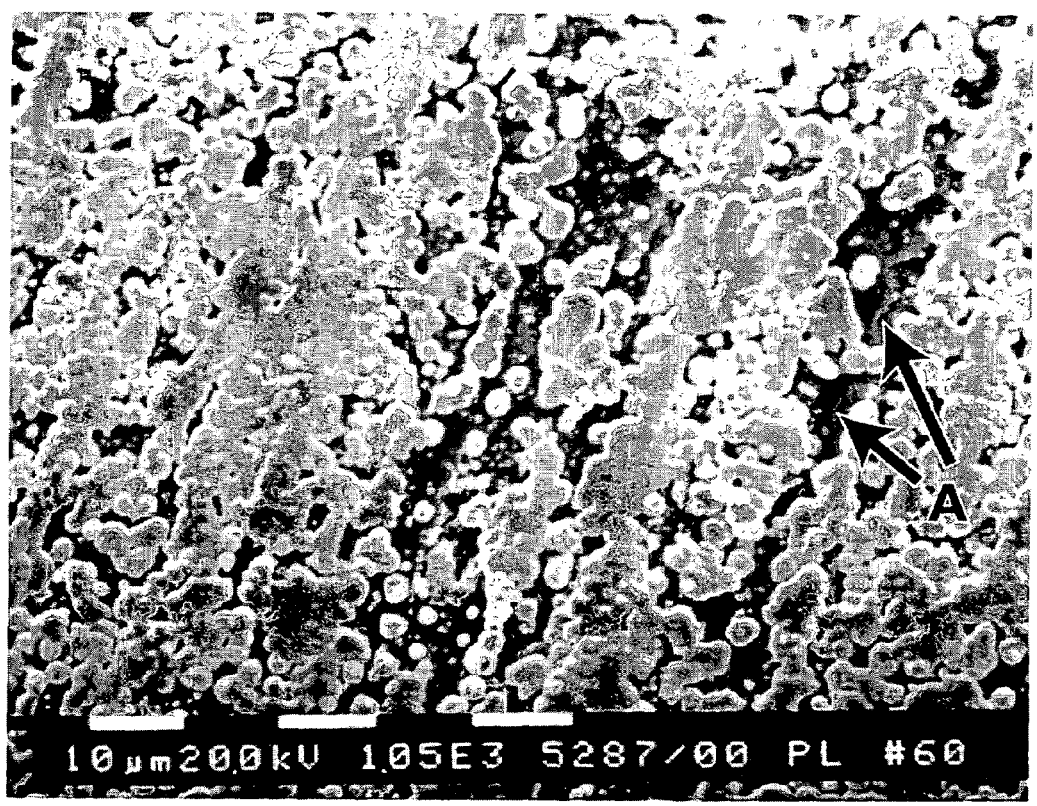
FIG. 4 is an SEM image of the surface of a brazing sheet subsequent to brush cleaning and nickel plating.
Figure 5:
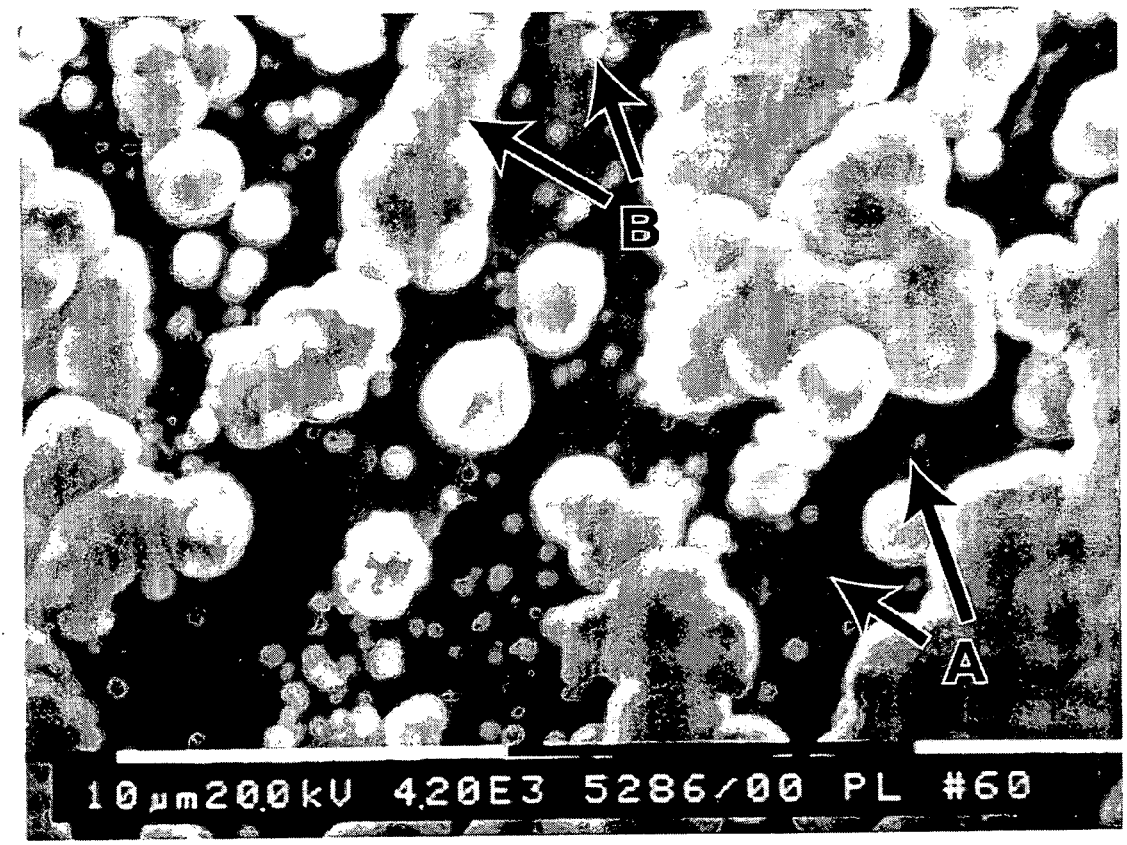
FIG. 5 is a magnified view of FIG. 4.
Figure 6:
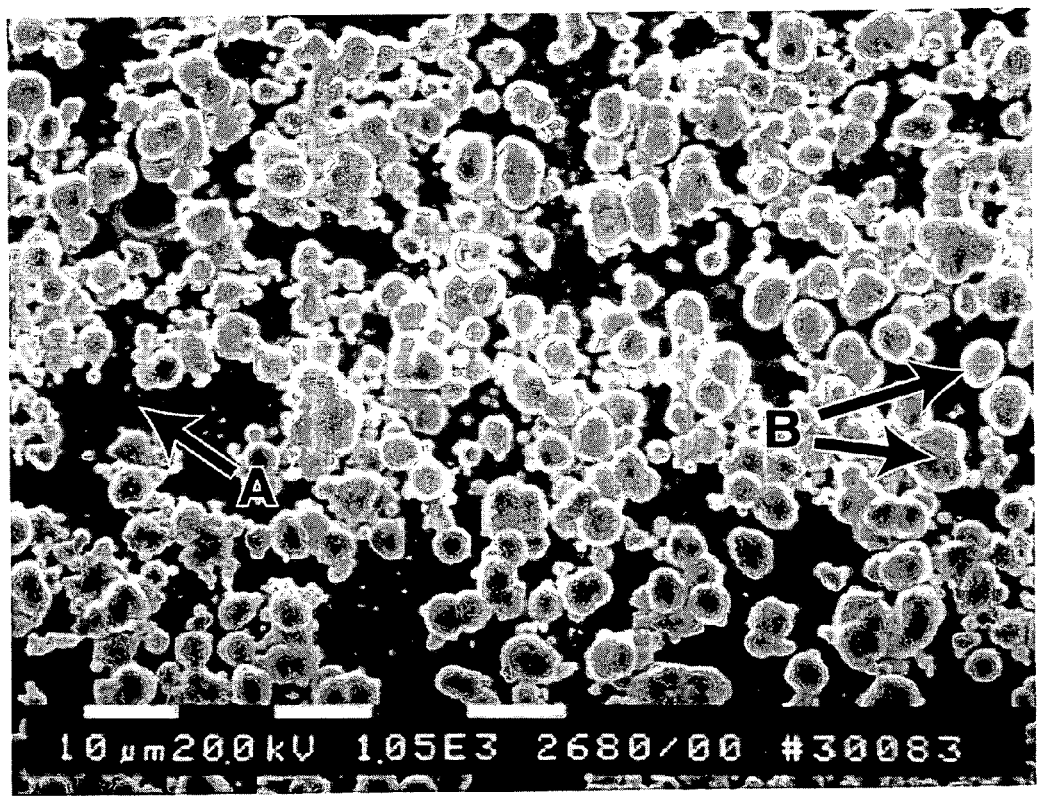
FIG. 6 is an sem image of the surface of a brazing sheet subsequent to nickel plating in the absence of brush cleaning.

This increased ability is evident upon a comparison of FIGS. 4 and 6, which show, respectively, nickel deposits following brush cleaning, and in the absence of brush cleaning. The nickel deposits in the absence of brush cleaning, indicated by arrow b in FIG. 6, are clearly distributed in an irregular pattern across the surface of the substrate, indicated by arrow a, which pattern mirrors the location of silicon particles at or near the surface, which tend to promote nucleation of nickel. Complete coverage of the aluminum surface by the nickel is somewhat limited, in that nucleation of new ni nodules in the bare aluminum surface regions is more difficult in comparison to preferential nucleation on the silicon particles. In contrast, the pattern of nickel deposit following brush cleaning is in an even, striated pattern, which follows the bristle direction. This striated surface fosters improved nucleation of the plated deposit, leading to improved coverage as well as increased nucleation rate. In FIG. 5, for example, it is observed that fine ni nodules continue to grow in the striation regions even as larger nodules continue to grow. It is speculated that this more even distribution is resultant both from the presence of the reentrant edges, indicated by arrows a in FIGS. 4 and 5, which serve to lessen the likelihood that nucleated metals, indicated by arrow b in FIG. 5, will be dislodged, to reenter the solution, and, particularly in the case of nickel, from a tendency of the bristles to mottle the aluminum substrate but not substantially expose silicon particles, thereby lessening the likelihood that they will preferentially attract nickel. In the context of nickel-lead deposition, it is believed that this phenomena is even more pronounced, having regard to the ability of lead to plate preferentially as compared to nickel. Particularly, it has been established by auger surface analysis that, upon immersion of uncoated aluminum into a plating bath of the type described in U.S. Pat. No. 4,028,200, the initial deposit has a relatively high concentration of lead or bismuth. That is, to a certain extent, the U.S. Pat. No. 4,028,200 process plates as well as it does because it provides for its own "lead preplate" during the initial stages of plating. It therefore follows that a mechanical abrasion should improve plating speed of nickel-lead deposition, given that the initial, difficult nucleation step, that is, the "lead preplate" step, is itself expedited by mechanical abrasion.

In circumstances wherein the nickel is not intended to be plated directly on the aluminum substrate, it has been found that utilization of the plating process described in U.S. Pat. No. 4,208,200, which incorporates a generally alkaline bath, remains a viable option. The usefulness of this process in applying, on a zinc (tin, lead, etc.) Coated aluminum substrate, a nickel-lead layer that is amenable to fluxless brazing, is evidenced by the following:

Example 36

A coupon was caustic cleaned for 45 seconds; tap water rinsed; and deoxidized in Oakite L25 for 10 seconds; tap water rinsed; and then immersed in a zinc displacement solution including 25% sodium hydroxide, 5% zinc oxide, for 10 seconds, at ambient temperatures, to achieve a uniform zinc coating and nickel plated in a 35° C. solution including 70 g/l $NiSO_4.6H_2O$, 30 g/l $NiCl_2.6H_2O$, 120 g/l sodium citrate, 20 g/l sodium acetate, 15 g/l $(NH_4)_2SO_4$ [pH 8.2, by 18 be $NH_4OH$] at 25 $mA/cm^2$ for 120 seconds. The tube was not treated prior to arrangement on the coupon. A fair braze was observed.

Example 37

A coupon was caustic cleaned for 45 seconds; tap water rinsed; and deoxidized in Oakite L25 for 10 seconds; tap water rinsed; immersed in a zinc displacement solution including 25% sodium hydroxide, 5% zinc oxide, for 10 seconds, at ambient temperatures, to a uniform zinc coating; and nickel plated in a 35° C. solution including 70 g/l $NiSO_4.6H_2O$, 30 g/l $NiCl_2.6H_2O$, 120 g/l sodium citrate 20 g/l sodium acetate, 15 g/l $(NH_4)_2SO_4$ and 1.2 g/l lead acetate [pH 8.2, by 18 be $NH_4OH$] at 25 $mA/cm^2$ for 120 seconds. The tube was not treated prior to arrangement on the coupon. An excellent braze was observed.

Example 38

A coupon was etched in a 10% caustic, 1% sodium gluconate solution for 45 seconds; tap water rinsed; and immersed in a solution including 250 g/l sodium hydroxide, 4 g/l sodium gluconate, 2.5 g/l $Bi_2O_3$ for 20 seconds, at ambient temperatures, to a uniform bismuth coating; and nickel plated in a 35° C. solution including 70 g/l $NiSO_4.6H_2O$, 30 g/l $NiCl_2.6H_2O$, 120 g/l sodium citrate, 20 g/l sodium acetate, 15 g/l $(NH_4)_2SO_4$ [pH 8.2, by 18 be $NH_4OH$] at 25 $mA/cm^2$ for 120 seconds. The tube was not treated prior to arrangement on the coupon. An excellent braze was observed.

Finally, it is to be understood that while but four preferred embodiments, in the nature of articles of manufacture, have been herein shown and described, many variants in, inter alia, size and shape of parts may be made within departing from the spirit or scope of the invention. Similarly, while it is to be understood that while but nine embodiments of the plating baths of the present invention have been herein shown and described, many variants in, inter alia, process characteristics may be made without departing from the spirit or scope of the invention. As well, while the disclosure is directed primarily to heat exchanger construction, it will be evident that the teachings of the present invention have broader application, and may be usefully practised, for example, in the construction of many structures and devices. Accordingly, the scope of the invention is limited only by the claims appended hereto, purposively construed.

What is claimed is:

1. A method of manufacturing an article of manufacture for use in a fluxless brazing process, the method comprising:
    (a) providing a substrate containing aluminum;
    (b) applying to the substrate a bonding layer which comprises ions of one or more metals selected from the group consisting of zinc, tin, lead, bismuth, nickel, antimony and thallium; and
    (c) electroplating a braze-promoting layer onto said bonding layer, said braze-promoting layer comprising one or more metals selected from nickel and cobalt;
    wherein the electroplating is carried out in an aqueous bath having a pH of from about 2 to 7 and including, in solution, ions of said one or more metals, citrate ion and ammonium ion, wherein the mole ratio of metal ions:citrate ion:ammonium ion in solution is about 1:0.5 to 1.5:1 to 6;
    wherein application of the bonding layer is preceded by or concurrent with a brush cleaning of the substrate such that the target surface defines a plurality of reentrant edges; and
    wherein the brush cleaning is effected through nylon or stainless steel brushes.

2. A method according to claim 1, wherein said aqueous bath comprises a solution of:
    from about 3 to about 20 weight percent of nickel sulfate;
    from about 3 to about 10 weight percent of nickel chloride;
    from about 6 to about 30 weight percent of sodium citrate;
    from about 0.005 to about 1.0 weight percent of a lead salt selected from the group consisting of lead acetate and lead citrate; and
    ammonium ion.

3. A method of manufacturing an article of manufacture for use in a fluxless brazing process, the method comprising:
    (a) providing a substrate containing aluminum; and
    (b) electroplating a braze-promoting layer onto said substrate, said braze-promoting layer comprising nickel;
    wherein the electroplating is carried out in an aqueous bath comprising nickel ion, ammonium ion and boric acid, wherein the pH of the bath is between 2 and 7.

4. A method according to claim 3, wherein the pH of the bath is between 3 and 7.

5. A method according to claim 3, wherein the pH of the bath is between 3.2 and 6.2.

6. A method according to claim 3, wherein the aqueous bath further comprises ions of one or more metal alloying elements in solution, said alloying elements being selected from the group consisting of lead, bismuth and thallium and being present in the aqueous bath in sufficient amounts to serve as wetting agents in the braze-promoting layer.

7. A method according to claim 6, wherein the aqueous bath further comprises one or more complexing agents selected from acetate ion and gluconate ion, said complexing agents forming soluble complexes with the ions of said alloying elements in the aqueous bath.

8. A method according to claim 3, wherein the aqueous bath further comprises one or more nickel chelating agents selected from citrate ion and EDTA, said complexing agents forming soluble complexes with the ions of said alloying elements in the aqueous bath.

9. A method according to claim 3, further comprising the step of:
    applying to the substrate a bonding layer which comprises one or more metals selected from the group consisting of zinc, tin, lead, bismuth, nickel, antimony and thallium; wherein the braze-promoting layer is electroplated onto the bonding layer.

10. A method according to claim 9, wherein the bonding layer comprises zinc or tin.

11. A method according to claim 10, wherein application of the bonding layer comprises an immersion zincate or stannate treatment.

12. A method according to claim 9, wherein the bonding layer comprises bismuth.

13. A method according to claim 9, wherein the bonding layer comprises lead.

14. A method according to claim 9, wherein application of the bonding layer is preceded by or concurrent with mechanical abrasion of the substrate such that the target surface defines a plurality of reentrant edges.

15. A method according to claim 13, wherein the mechanical abrasion constitutes a brush cleaning of the surface.

16. A method according to claim 15, wherein the brush cleaning is effected through nylon or stainless steel brushes.

17. A method according to claim 3, wherein the bath further comprises an acid based on anions of the nickel and/or the ammonium ions in the aqueous bath.

18. A method according to claim 17, wherein the acid based on anions of the nickel and/or the ammonium ions is selected from the group consisting of hydrochloric acid, acetic acid and sulfuric acid.

19. A method according to claim 3, wherein the electroplating is carried out with process parameters as follows:
    (a) electroplating bath temperature 25–30° C.;
    (b) electroplating bath pH in the range of 3.2 to 6.2, controlled with sulfuric, acetic or hydrochloric acid;
    (c) current density of 50 mA/cm$^2$;
    (d) plating time 1 to 300 seconds; and
    (e) bath composition comprising about 100 g/l nickel chloride, 5–150 g/l sodium citrate, 1 g/l lead acetate and 5–100 g/l ammonium chloride.

20. A method according to claim 19, wherein the bath composition further comprises 30 g/l boric acid.

21. A method according to claim 19, further comprising the step of:
    applying to the substrate a bonding layer which comprises one or more metals selected from the group consisting of zinc, tin, lead, bismuth, nickel, antimony and thallium; wherein the braze-promoting layer is electroplated onto the bonding layer.

22. A method according to claim 21, wherein the bonding layer comprises bismuth.

23. A method of manufacturing an article of manufacture for use in a fluxless brazing process, the method comprising:
    (a) providing a substrate containing aluminum;
    (b) applying to the substrate a bonding layer which comprises one or more metals selected from the group consisting of lead, bismuth, nickel, antimony and thallium; and
    (c) electroplating a braze-promoting layer onto said bonding layer, said braze-promoting layer comprising nickel;
    wherein the electroplating is carried out in an aqueous bath comprising nickel ion and ammonium ion in solution and further comprising boric acid.

24. A method according to claim 23, wherein the aqueous bath further comprises an acid in an amount sufficient to adjust the pH of the bath to between 2 and 7.

25. A method of manufacturing an article of manufacture for use in a fluxless brazing process, the method comprising:
(a) providing a substrate containing aluminum; and
(b) electroplating a braze-promoting layer onto said substrate, said braze-promoting layer comprising nickel;
wherein the electroplating is carried out in an aqueous bath comprising nickel ion and ammonium ion in solution, and further comprises EDTA as a nickel chelating agent.

26. A method of manufacturing an article of manufacture for use in a fluxless brazing process, the method comprising:
(a) providing a substrate containing aluminum, the substrate having a target surface;
(b) applying to the target surface a bonding layer which comprises one or more metals selected from the group consisting of zinc, tin, lead, bismuth, nickel, antimony and thallium; and
(c) electroplating a braze-promoting layer onto said bonding layer, said braze-promoting layer comprising nickel;
wherein application of the bonding layer is concurrent with mechanical abrasion of the substrate such that the target surface defines a plurality of reentrant edges.

27. A method of manufacturing an article of manufacture for use in a fluxless brazing process, the method comprising:
(a) providing a substrate containing aluminum, the substrate having a target surface;
(b) mechanically abrading the target surface of the substrate so that the target surface defines a plurality of reentrant edges; and
(c) electroplating a braze-promoting layer onto said mechanically-abraded target surface;
wherein the mechanical abrasion comprises a brush cleaning of the surface using nylon or stainless steel brushes.

28. A method according to claim 27, wherein the nylon brushes are comprised of nylon fibers impregnated with ceramic particles.

29. A method according to claim 27, further comprising the step of:
applying to the target surface a bonding layer which comprises one or more metals selected from the group consisting of zinc, tin, lead, bismuth, nickel, antimony and thallium;
wherein said step of mechanically abrading the target surface is concurrent with or precedes the step of applying the bonding layer, and wherein the bonding layer is electroplated onto the bonding layer.

30. A method according to claim 1, wherein the nylon brushes are comprised of nylon fibers impregnated with ceramic particles.

* * * * *

UNITED STATES PATENT AND TRADEMARK OFFICE
CERTIFICATE OF CORRECTION

PATENT NO. : 7,000,823 B2
DATED : February 21, 2006
INVENTOR(S) : Kostas F. Dockus et al.

It is certified that error appears in the above-identified patent and that said Letters Patent is hereby corrected as shown below:

<u>Column 44,</u>
Line 19, "A method according to claim 13" should read -- A method according to claim 14 --.

Signed and Sealed this

Sixteenth Day of May, 2006

JON W. DUDAS
*Director of the United States Patent and Trademark Office*